July 15, 1958 R. E. GOTTFRIED ET AL 2,843,655
SUBSCRIPTION TELEVISION WITH SCRAMBLED
TRANSMISSION AND MARQUEE AND BARKER
Filed Dec. 3, 1951 12 Sheets-Sheet 7
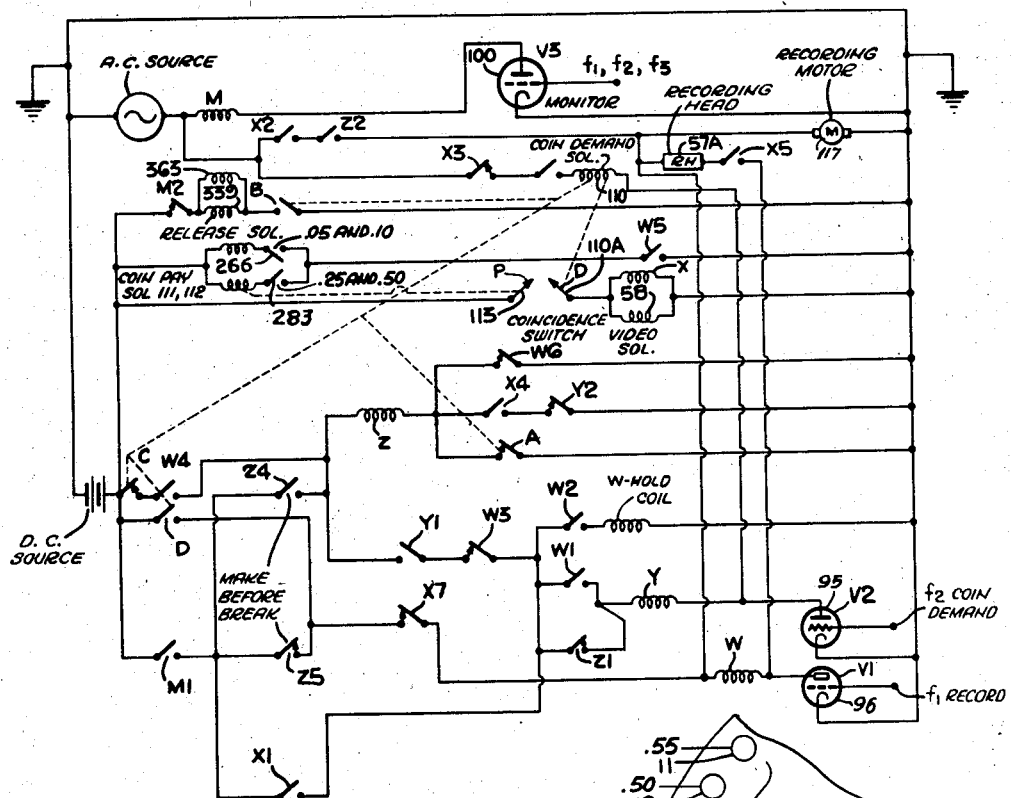
FIG. 17.
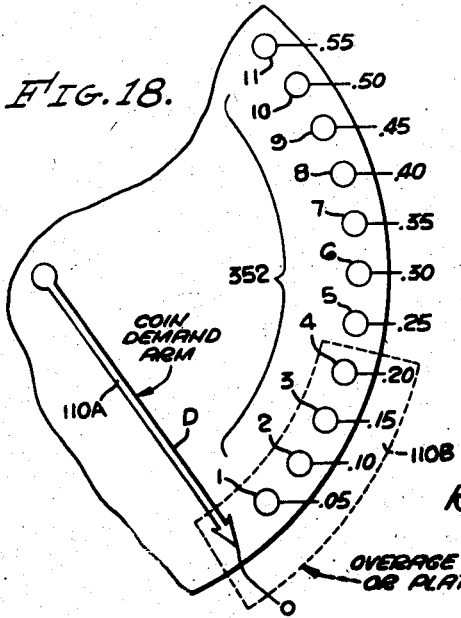
FIG. 18.
FIG. 19.
INVENTORS.
ROBERT E. GOTTFRIED, ALLEN D. HOFFMANN
BY LOUIS N. RIDENOUR
Lyon & Lyon
ATTORNEYS.

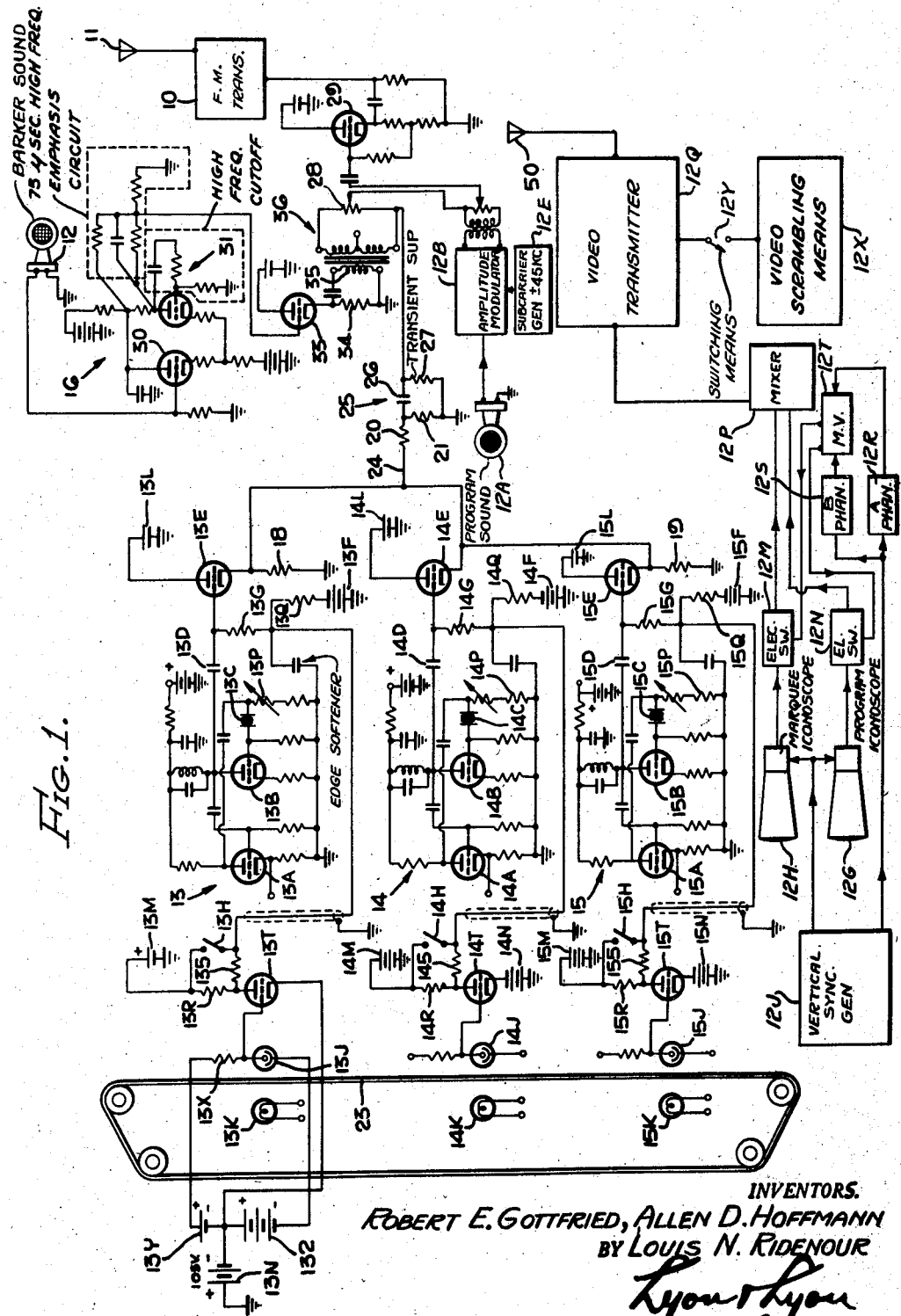

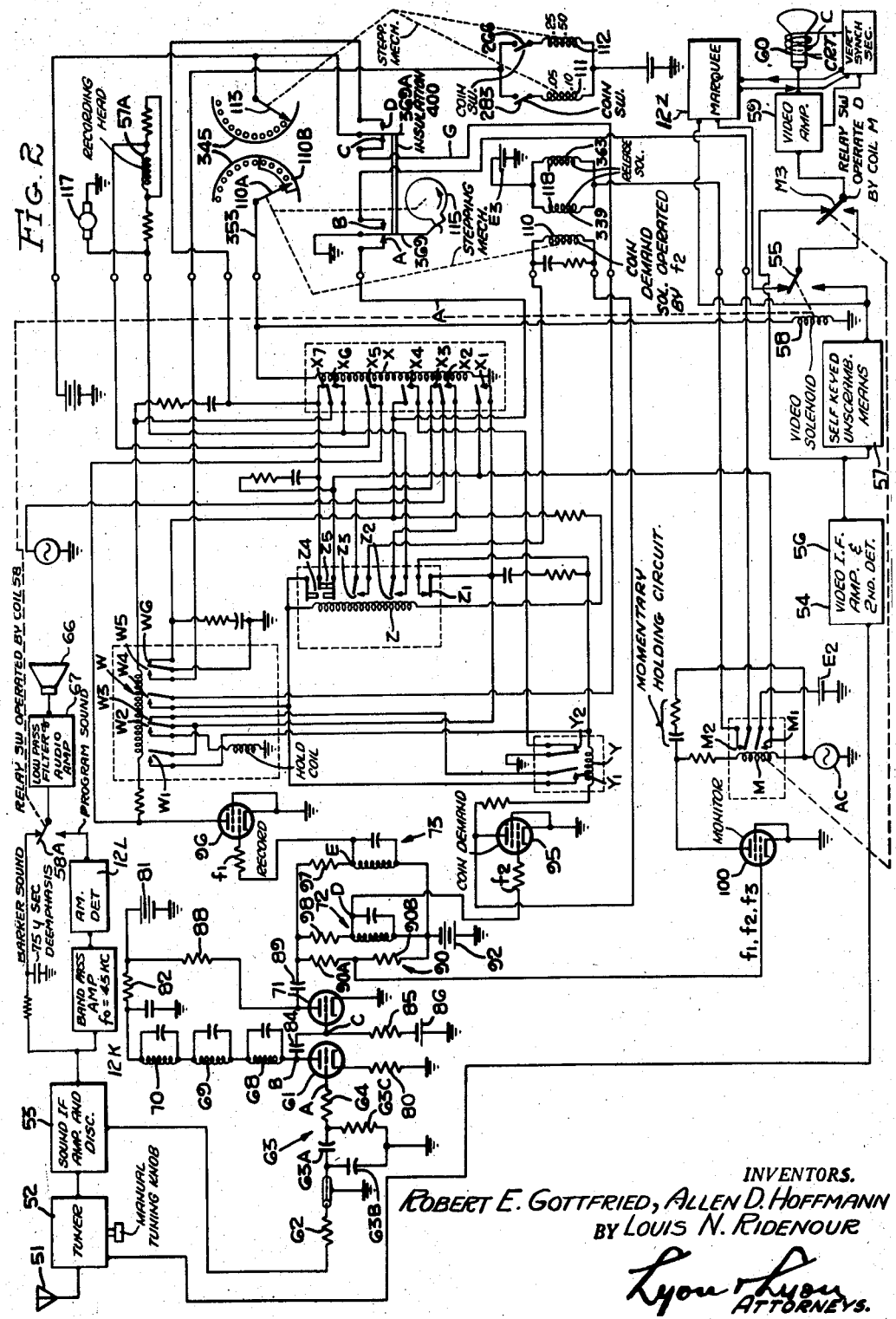

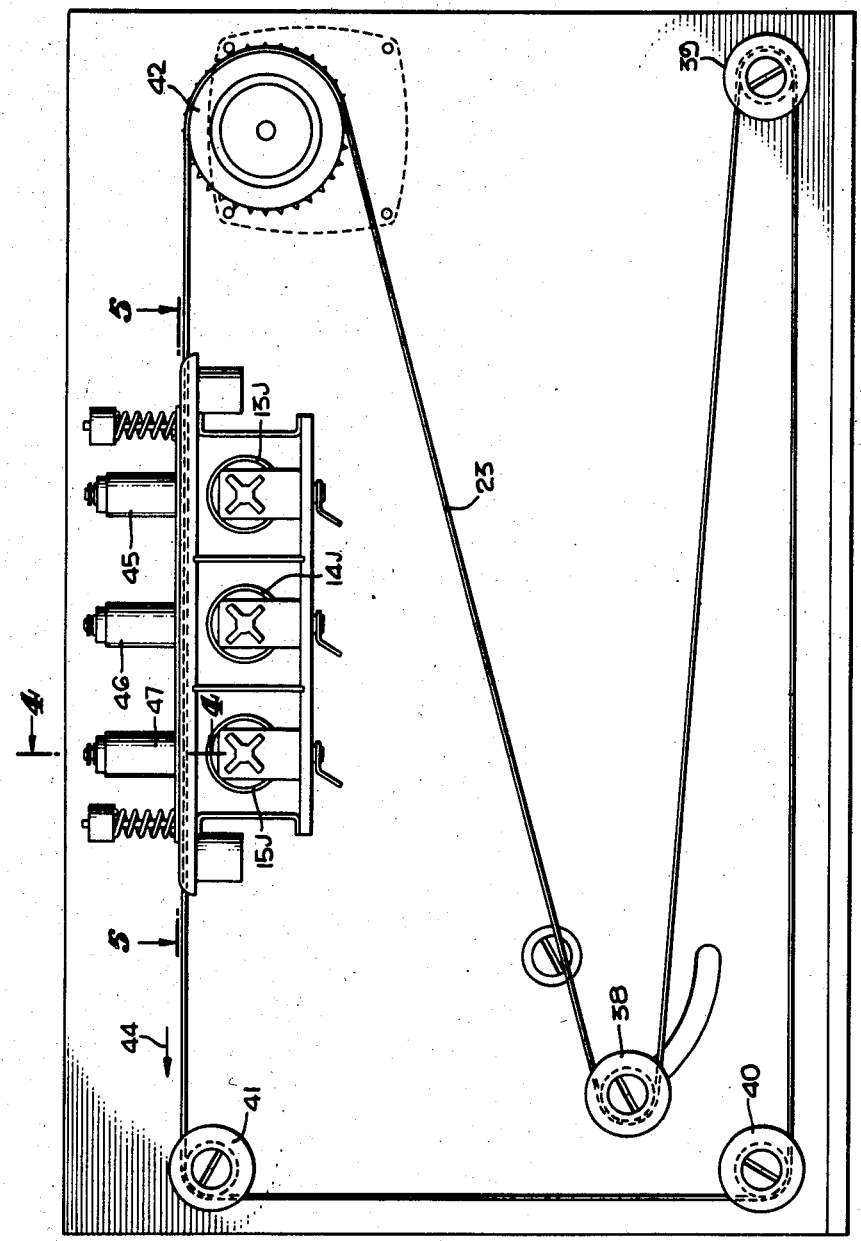

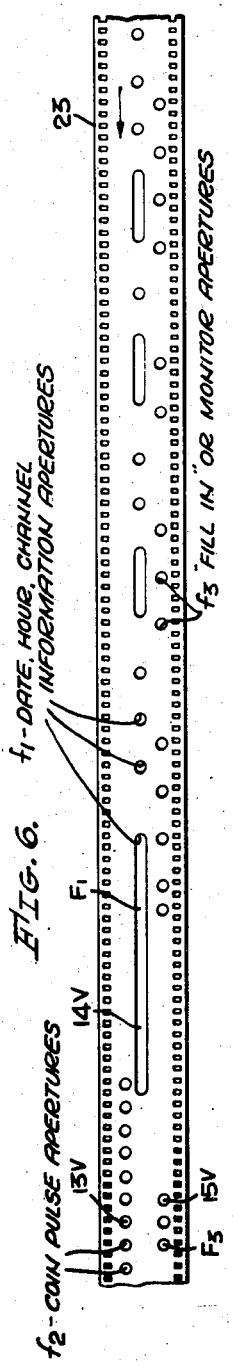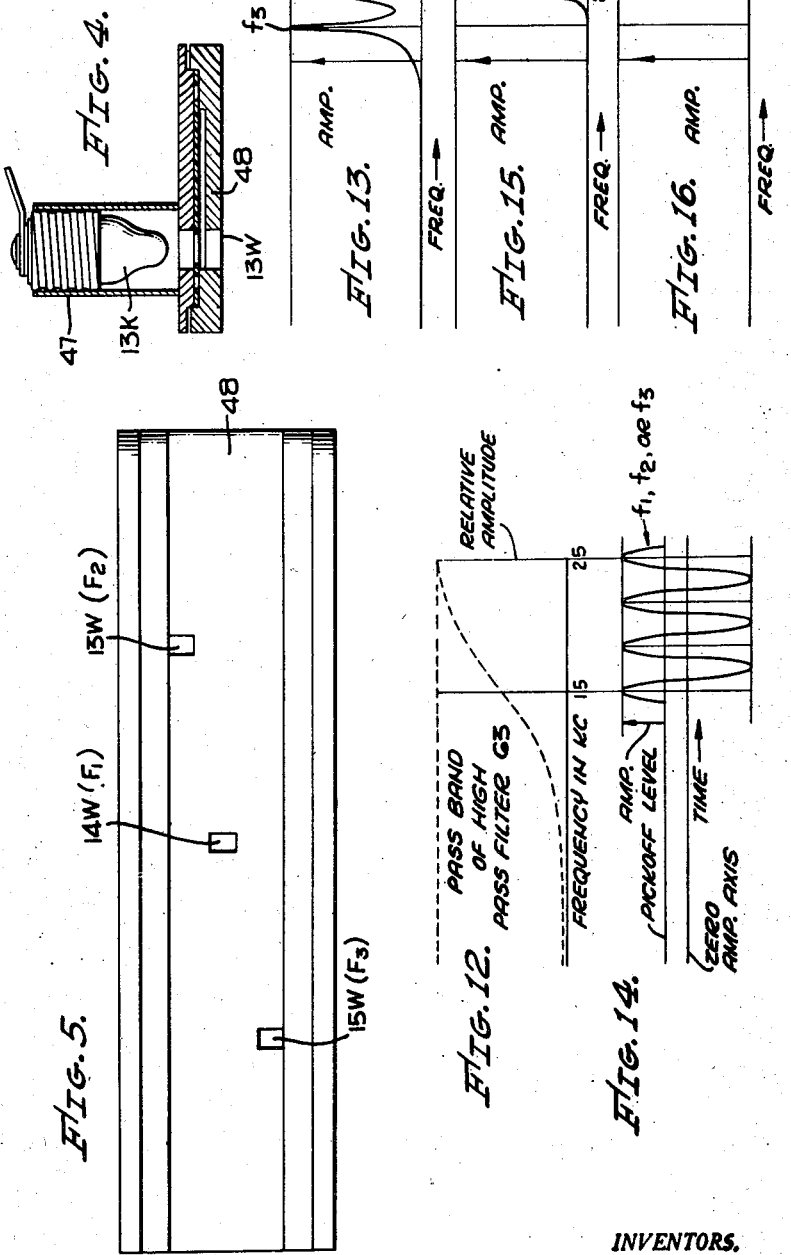

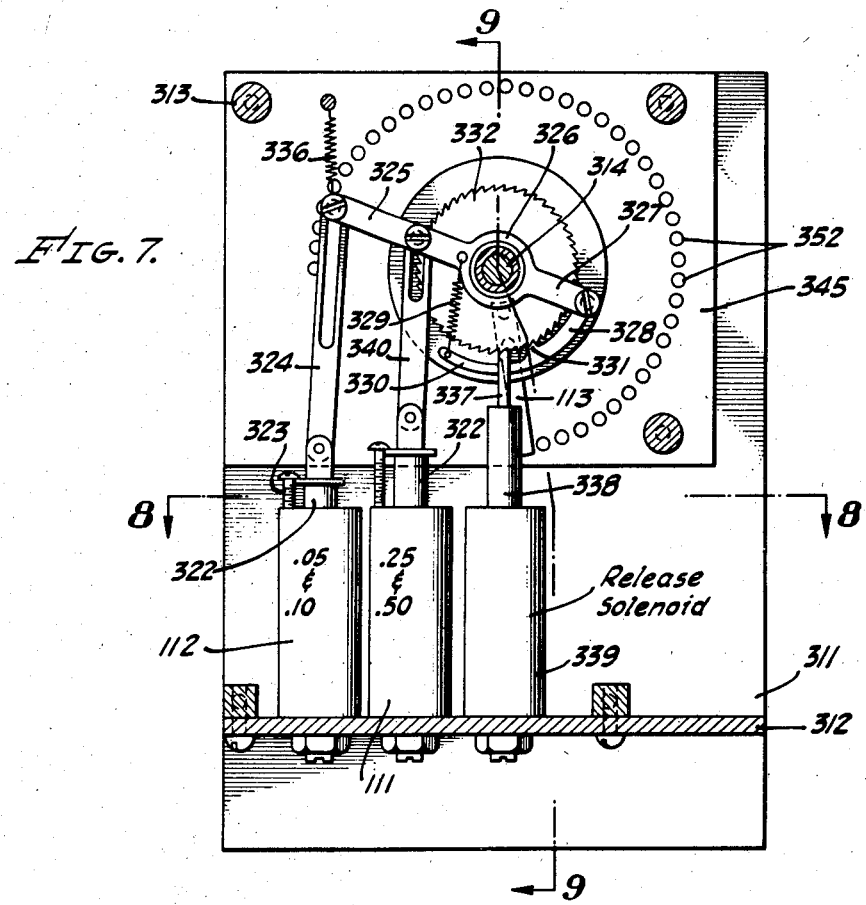
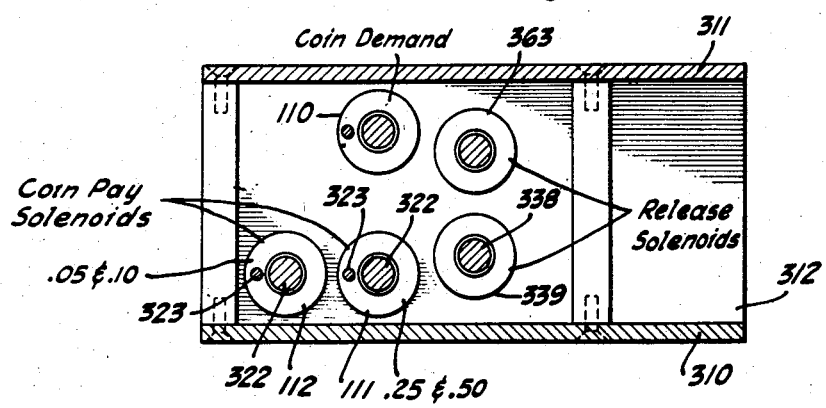

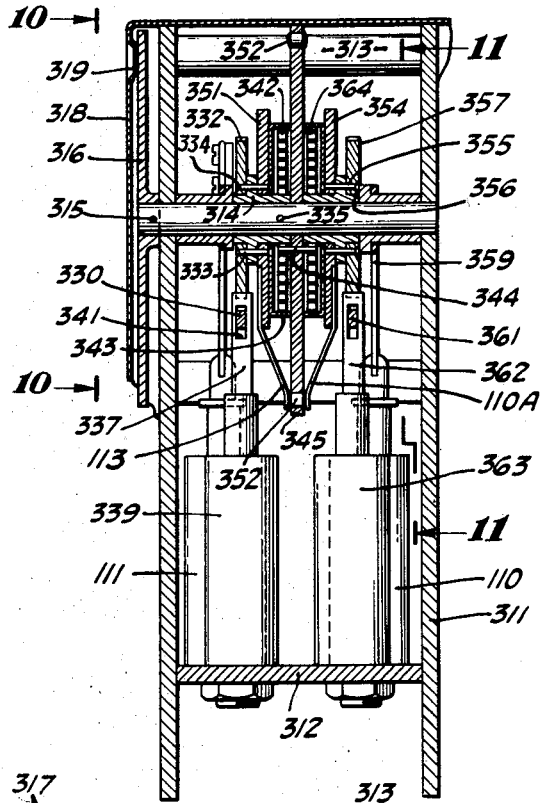
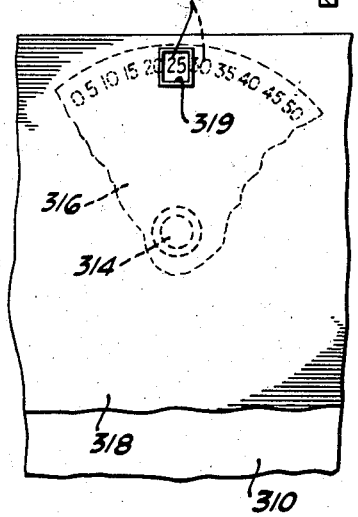
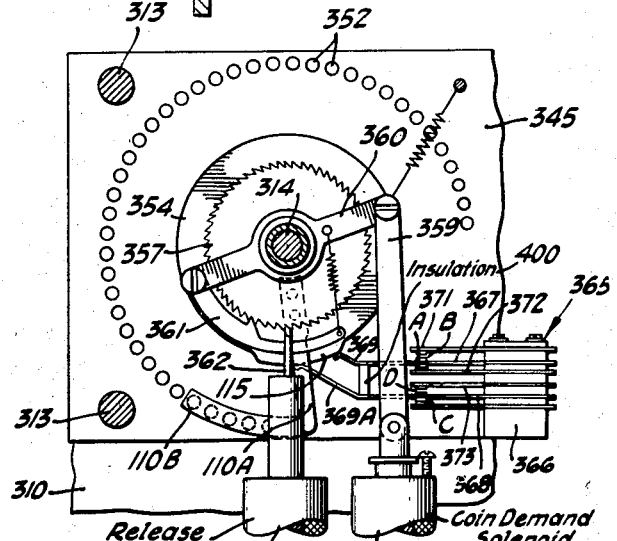

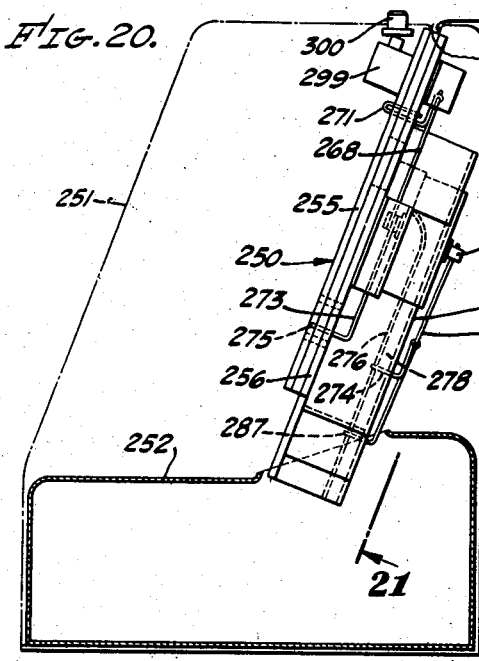

INVENTORS
ROBERT E. GOTTFRIED, ALLEN D. HOFFMANN,
BY LOUIS N. RIDENOUR

ATTORNEYS.

July 15, 1958 R. E. GOTTFRIED ET AL 2,843,655
SUBSCRIPTION TELEVISION WITH SCRAMBLED
TRANSMISSION AND MARQUEE AND BARKER
Filed Dec. 3, 1951 12 Sheets-Sheet 10

INVENTORS.
ROBERT E. GOTTFRIED, ALLEN D. HOFFMANN,
BY LOUIS N. RIDENOUR
Lyon r Lyon
ATTORNEYS.

July 15, 1958

R. E. GOTTFRIED ET AL 2,843,655

SUBSCRIPTION TELEVISION WITH SCRAMBLED
TRANSMISSION AND MARQUEE AND BARKER

Filed Dec. 3, 1951

INVENTOR.
ROBERT E. GOTTFRIED, ALLEN D. HOFFMANN
BY LOUIS N. RIDENOUR

Lyon & Lyon
ATTORNEYS

July 15, 1958

R. E. GOTTFRIED ET AL 2,843,655

SUBSCRIPTION TELEVISION WITH SCRAMBLED
TRANSMISSION AND MARQUEE AND BARKER

Filed Dec. 3, 1951

INVENTOR.
ROBERT E. GOTTFRIED
ALLEN D. HOFFMANN
BY LOUIS N. RIDENOUR

Lyon & Lyon
ATTORNEYS

2,843,655

SUBSCRIPTION TELEVISION WITH SCRAMBLED TRANSMISSION AND MARQUEE AND BARKER

Robert E. Gottfried, West Los Angeles, Allen D. Hoffmann, Los Angeles, and Louis N. Ridenour, Laguna Beach, Calif., assignors to International Telemeter Corporation, Los Angeles, Calif., a corporation of Delaware Application December 3, 1951, Serial No. 259,636

11 Claims. (Cl. 178—5.1)

The present invention relates to improvements in subscription transmissions and in particular to subscription television such as for example to systems of this character using scrambled television signals, such systems being rendered operative, upon the user or subscriber at the receiving station acknowledging a coin demand which is also conveyed to the receiving station from the transmitting station.

In general, the system described herein constitutes an improvement in the system described and claimed in co-pending application of Robert E. Gottfried et al., Serial No. 225,651, filed May 10, 1951, now Patent No. 2,769,026, issued October 30, 1956, and assigned to the present assignee, in that the present system incorporates means for apprising the user or subscriber, prior to coin acknowledgment, as to the program which is available to him, upon acknowledging the coin demand, such information being conveyed to him both visually and orally, i. e., in the form of a "marquee" and "barker."

The term "marquee" as used herein is intended to connote information present in visual form for apprising the user or subscriber as to the program which he may see upon acknowledging a coin demand. By thus providing a "marquee," conditions akin to "going" to a motion picture theatre are established, in that a theatre goer, before paying his money at the ticket counter is subjected to the information appearing on the theatre marquee.

The term "barker" as used herein has reference to audible signals available to the user or subscriber for apprising such user as to the program being transmitted.

The "barker" and "marquee" are thus intended to convey generally the same information, but one is accomplished orally and the other visually respectively.

It is therefore an object of the present invention to provide an improved system of this character in which a "marquee" and/or "barker" is provided.

Another object of the present invention is to provide an improved system of this character for accomplishing the results indicated above in an arrangement which is compatible with present Federal Communications Commission standards.

Another object of the present invention is to provide an improved system of this character which, prior to coin acknowledgment by the user or subscriber, apprises such user or subscriber both visually and orally as to the program being transmitted, i. e., the user is provided with a so-called "marquee" and is subjected to a "barker."

While the present arrangement shows the use of both a "marquee" and a "barker," it is noted that both need not be present for accomplishing the general purpose, but it is desired to have both present. In other words, the system may be operated with the "barker" alone, with the "marquee" alone, or, as is preferred herein, with both the "barker" and the "marquee."

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a schematic diagram of apparatus at one of the plurality of transmitting stations and embodies features of the present invention, the apparatus being a part of the frequency modulation system for modulating the sound carrier both with the program audio and three tone signals.

Figure 2 is a schematic representation of some of the apparatus at the receiving station which is sensitive to the frequency modulation components on the sound carrier transmitted by the apparatus shown in Figure 1.

Figure 3 is a view in side elevation of a portion of the photoelectrically operated apparatus shown schematically in Figure 1, used for purposes of effecting tone modulation in accordance with perforations in an endless tape.

Figure 4 is a sectional view taken generally on the line 4—4 of Figure 3.

Figure 5 is a view taken as indicated by the line 5—5 in Figure 3 and serves to show three perforated apertures used in developing three corresponding tone signals.

Figure 6 is a plan view of a portion of the endless tape shown in Figure 3, and the section of the tape illustrated includes all perforations for producing one cycle of operation.

Figure 7 is a front elevational view of a coin integrator and comparator used at the receiving station in cooperation with the coin sorter and coin counter.

Figure 8 is a sectional view taken substantially along the line 8—8 of Figure 7.

Figure 9 is a vertical sectional view taken substantially along the line 9—9 of Figure 7.

Figure 10 is a fragmentary elevational view taken as indicated at 10—10 in Figure 9.

Figure 11 is a fragmentary rear elevational view of the apparatus shown in Figure 7, Figure 11 being taken in the direction indicated by the line 11—11 in Figure 9.

Figures 12–16, both inclusive, serve to illustrate certain amplitude changes which the detected sound signals undergo in relationship to their frequencies at the points A, B, C, D and E, respectively, in Figure 2.

Figure 17 shows in more simplified form the relay switching arrangement shown in Figure 2.

Figures 18 and 19, respectively, show in enlarged form the manner in which the coin demand arm and the coin actuated arm shown in Figures 2 and 17 coact with common stationary contacts for achieving a coincident condition.

Figure 20 is a side view of a coin collecting, sorting and counting mechanism for operating the coin pay switches in Figures 2 and 17.

Figure 21 is a rear elevational view of the coin sorting mechanism taken as indicated by the line 21—21 in Figure 20.

Figure 22 is a fragmentary sectional view taken substantially along the line 22—22 of Figure 21.

Figure 23 is a fragmentary sectional view taken substantially along the line 23—23 of Figure 21.

Figure 24 is a cross sectional view taken substantially along the line 24—24 of Figure 21.

Figure 25:
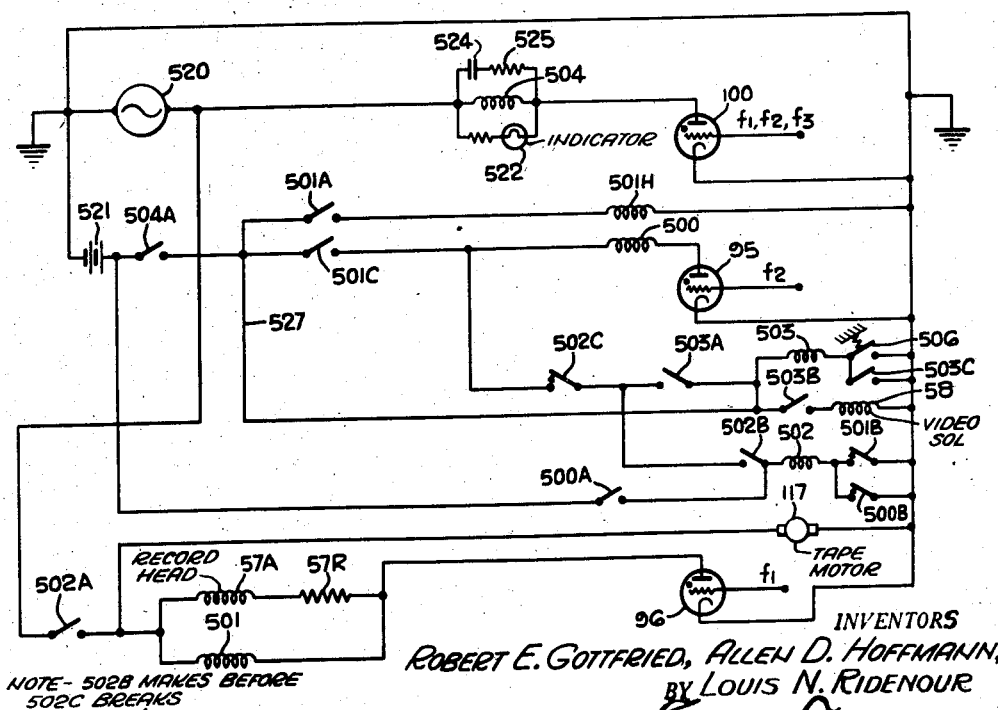

Figure 25 is a schematic representation of other pulse distribution apparatus in a modified system wherein the operator is not provided with a visual indication of the coinage demanded, but yet may cause unscrambling of the picture by operating a normally open switch 506 shown therein.

Figure 26:
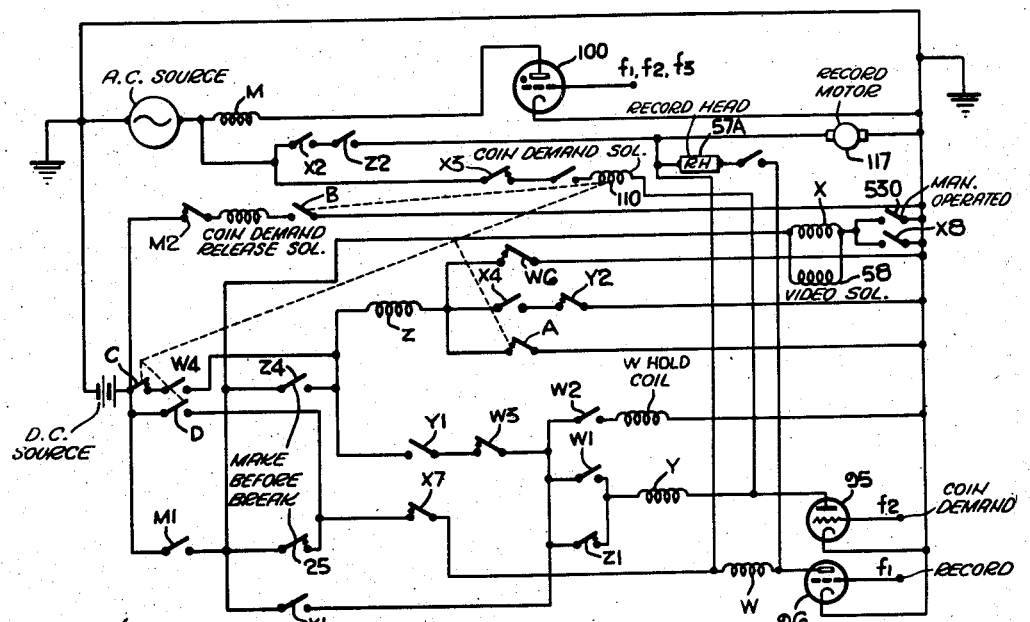

Figure 26 is a schematic representation of a second modification of the pulse distributing apparatus, and although the apparatus incorporates the structure shown in Figures 7, 8, 9, 10 and 11 as modified in subsequent figures for producing a visual indication of the coin demand, such coin demand may be acknowledged to produce an unscrambled picture by the user operating a switch.

Figure 27:
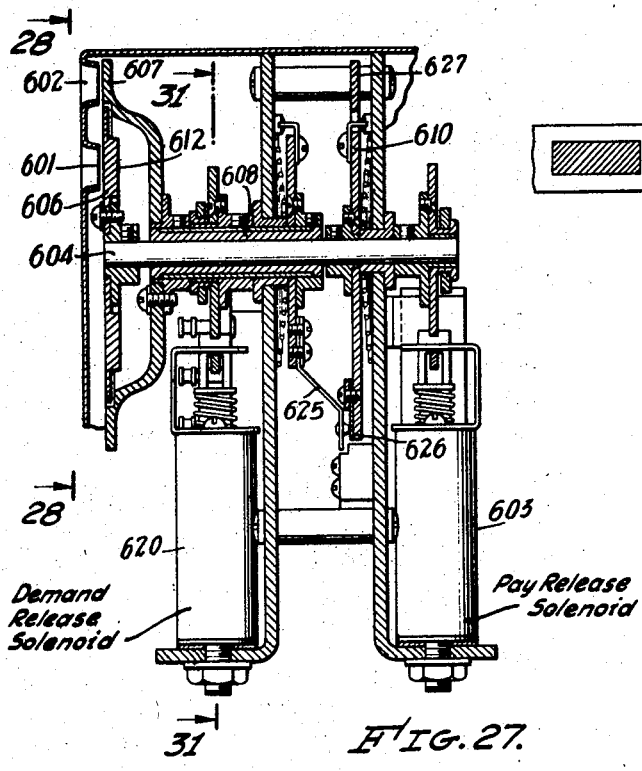
Figure 28:
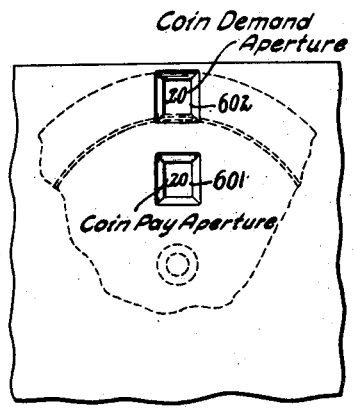

Figures 27 and 28 show a modified stepping mechanism embodying generally the functional features of the prototype apparatus shown in Figures 7–11, inclusive, but includes means whereby the user may obtain a visual indication of the coinage demanded.

Figure 29:
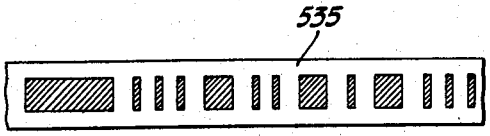

Figure 29 shows a recording tape with certain information recorded thereon in accordance with $f_1$ pulses caused by the so-called $f_1$ apertures in Figure 6.

Figure 30:
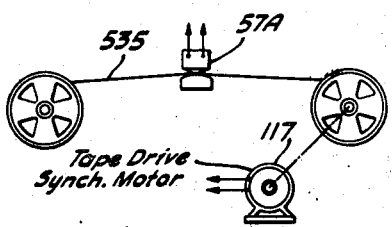

Figure 30 is a schematic representation of the recording mechanism including the recording tape, recording head and tape driving motor, all of which are controlled by the arrangements shown in the previous figures.

Figure 31:
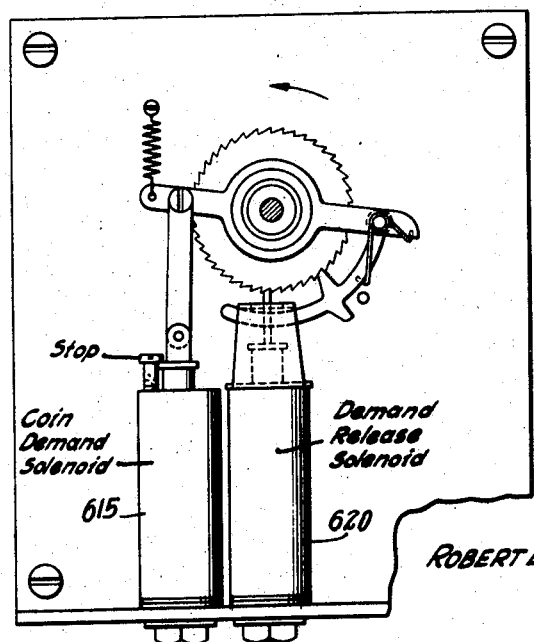

Figure 31 is a view in elevation of the coin demand stepping mechanism as viewed generally in the direction indicated by the lines 31—31 in Figure 27.

Figure 32:
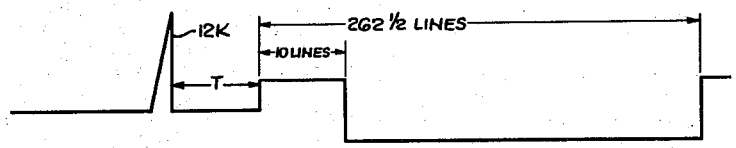

Figure 32 represents in graphical form operating characteristics of the video transmitting means shown in Figure 1.

Figure 33:
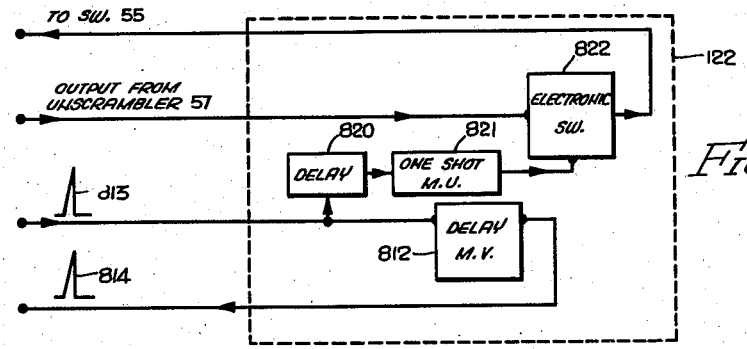

Figure 33 shows in more detailed form, circuitry in the marquee illustrated in Figure 2.

Figures 34, 35, 36, 37, 38 and 39 illustrate wave shapes present in the system illustrated in Figure 2 in relationship to the marquee illustrated in Figure 33.

Figure 40:
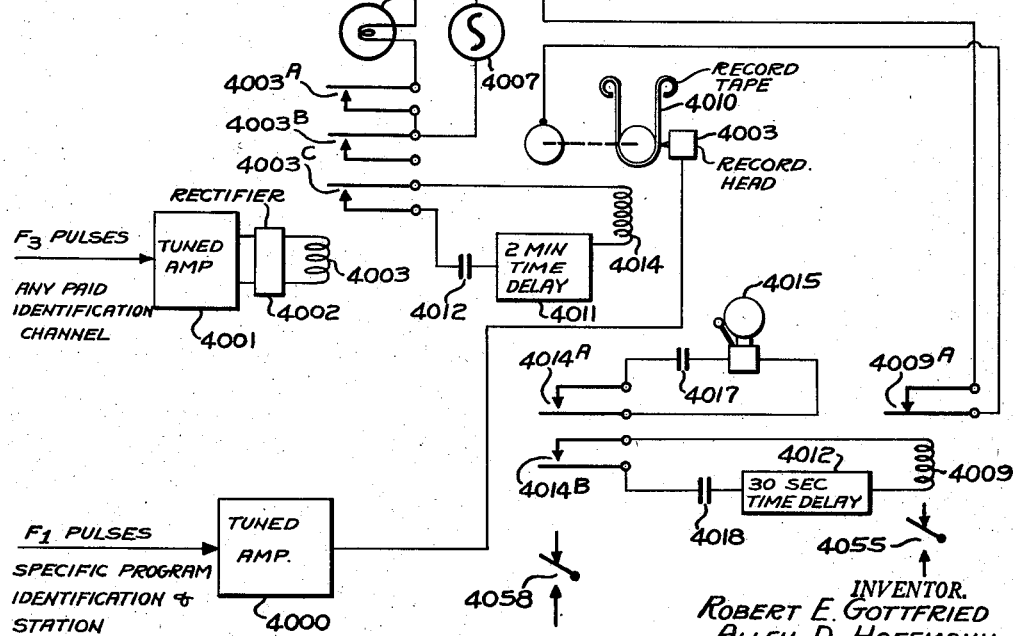

Figure 40 illustrates a modified arrangement wherein a "coin acknowledgment" may be made without the subscriber or user performing any positive act, i. e., by merely allowing time to elapse.

Figure 41:
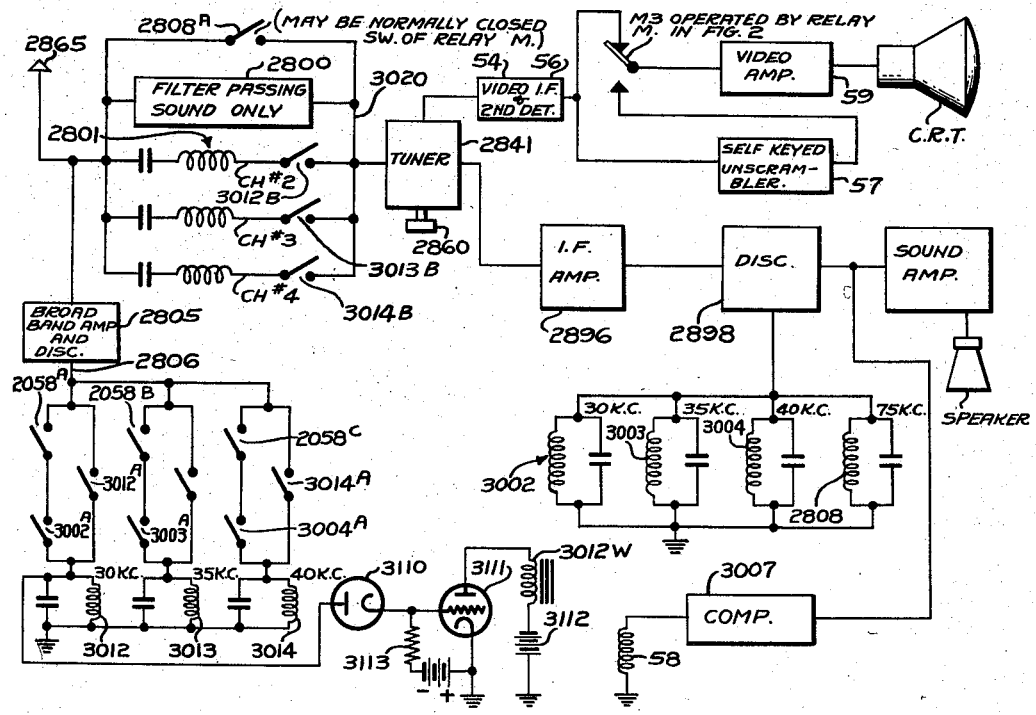

Figure 41 illustrates a modified arrangement.

With reference to Figure 1, the frequency modulated transmitter 10 serves to radiate into space, by means of antenna 11, frequency modulated signals, the components of which comprise first the "barker" audio signals developed, for example, in microphone, or, for example, phonograph pickup 12, and second the series of tone frequencies $f_1$, $f_2$ and $f_3$ developed respectively by the tone modulators 13, 14 and 15, and, third, the program audio or sound signals developed in microphone 12A and applied to the amplitude modulator stage 12B wherein a carrier of 45 kilocycles generated in stage 12E is amplitude modulated by the audio signals. The modulated waves are applied to the control grid of tube 29. The frequency of the tones $f_1$, $f_2$ and $f_3$ are shown herein respectively as being 17.9 kilocycles, 20 kilocycles and 22 kilocycles, which are frequencies well above the frequencies in the audible range developed in the sound modulator stage 16, which includes the microphone or pickup 12. Although we prefer that these three tone frequencies lie above the audible band for practical reasons, concepts of the present invention may be practiced when such frequencies $f_1$, $f_2$, $f_3$, or any one of them is a sub-audible frequency.

The modulator stages 13, 14 and 15 each includes continuously oscillating networks which include respectively pairs of tubes 13A, 13B, 14A, 14B, 15A, 15B, the frequency of oscillation in each of such networks 13, 14, 15 being determined by the frequency of the associated crystal 13C, 14C, 15C. While one specific type of supersonic oscillation network is shown in Figure 1, the present invention is not critical in that regard, for it is well understood that other types than the one shown may be used for these purposes. Oscillations developed in networks 13, 14 and 15 are transferred respectively through condensers 13D, 14D and 15D to the control grids of tubes 13E, 14E and 15E, respectively. The cathodes of these tubes 13E, 14E, 15E are returned to ground through parallel connected resistances 18 and 19 as well as by series circuit which includes the serially connected resistances 20 and 21.

While the oscillation networks 13, 14 and 15 continuously oscillate, their voltage output is not normally transferred to the cathode load resistances 18, 19, since in such normal condition the control grids of tubes 13E, 14E and 15E are biased by means described presently to cut off the flow of space current through such tubes. Such biasing means includes corresponding normally heavy conducting tubes 13T, 14T and 15T which have their anodes, normally at a relatively low potential, connected to the control grid of tubes 13E, 14E, and 15E, respectively, through series circuits comprising, respectively: resistances 13S and 13G; resistances 14S and 14G; and resistances 15S and 15G. The anodes of tubes 13T, 14T and 15T are connected to a positive terminal of corresponding anode voltage sources 13M, 14M and 15M through corresponding voltage dropping resistances 13R, 14R and 15R. The cathodes of tubes 13T, 14T and 15T are connected to the ungrounded negative terminal of voltage sources 13N, 14N and 15N, respectively. The control grids of tubes 13E, 14E and 15E are returned to ground, respectively, through the following series circuits: resistances 13G, 13Q and source 13F; resistances 14G, 14Q and source 14F; and resistances 15G, 15Q and source 15F. It is observed that the tubes 13E, 14E and 15E are connected essentially as gated cathode followers and have their anodes connected directly to the positive terminal of voltage sources 13L, 14L, and 15L, respectively.

The tubes 13T, 14T and 15T are coupled to phototubes 13J, 14J and 15J, respectively. All these photocells are connected in identical manner, and a detailed description of the connection of phototube 13J suffices to describe the other connections. The phototube 13J is connected in a series circuit with resistance 13X and voltage sources 13Y and 13Z. The anode of the phototube 13J is connected to the control grid of tube 13T, and the junction point of sources 13Y and 13Z is connected to the cathode of tube 13T, so that upon illumination of the tube 13J the control grid of tube 13T is driven negatively with respect to its cathode, to thereby cut off or appreciably reduce the flow of current through tube 13T, with the result that the potential at the anode of tube 13T increases to such an extent that the connected control grid of tube 13E rises sufficiently to become conductive and to thereby allow oscillations developed at the oscillator stage 13 to appear across the cathode output resistance 18.

These tubes 13E, 14E, 15E are rendered conducting either when the associated phototubes 13J, 14J, 15J are energized by the corresponding light sources 13K, 14K and 15K, or, in the alternative, when either one of the corresponding normally open test switches 13H, 14H or 15H is closed. Normally these phototubes 13J, 14J, 15J are not illuminated because of the opaque endless tape 23 which, however, is suitably apertured as indicated in Figure 3 to allow alternate illumination of such phototubes. It is noted that only one of the phototubes 13J, 14J, 15J is thus illuminated at any one particular time. Effectively, the normally nonconducting tubes 13E, 14E, 15E are gated on in timed sequence with movement of the tape 23, to thereby allow super-audible signals of frequencies $f_1$, $f_2$ and $f_3$ to alternately appear on the output lead 24.

It is observed that the adjustable resistances 13P, 14P and 15P in corresponding modulator stages 13, 14 and 15 are used to adjust the level of the corresponding signals $f_1$, $f_2$ and $f_3$ appearing on the lead 24. These signals appearing on lead 24 are transferred through the transient suppressing network 25 which includes the series condenser 26 and shunt connected resistance 27. The lead 24 is thus connected through serially connected resistance 20 and condenser 26, and through the adjustable tap on the potentiometer resistance 28 to the control grid of the cathode follower tube 29, on the grid of which is also applied the audio signals developed by the microphone or pickup 12. The current or voltage variations developed by such transducer 12 are applied to the control grid of the amplifying stage 30. The amplified output appearing on the anode of tube 30 is transferred through a conventional 75-microsecond emphasis circuit 31 for purposes of emphasizing the high frequencies in accordance with well established frequency modulating transmission techniques. The output of this network 31 is transferred to the control grid of the cathode follower tube 33, the cathode load resistance 34 of which is in shunt with the primary winding 35 of the transformer 36. The secondary winding of transformer 36 is connected to opposite outside terminals of potentiometer resistance 28, so that the movable tap on the resistance 28 may be adjusted to correspondingly adjust the output level of audio signal applied to the control grid of tube 29. The resulting mixed audio and tone signals appearing on the cathode of tube 29 are applied to the frequency modulation transmitter 10 and appear as frequency modulated components on the wave transmitted from antenna 11.

The particular mechanical tape driving means and associated lamp housing useful in generating the aforementioned tone signals $f_1$, $f_2$ and $f_3$ are now described in relationship to Figures 3, 4, 5 and 6 although it will be appreciated that the present invention is not critical as to the specific type of apparatus shown in such figures for accomplishing the aforementioned purposes, although the particular means described in these figures is the one preferred.

The endless perforated tape 23 in Figure 3 passes over idler wheels 38, 39, 40 and 41 and over the driving sprocket 42, so that the tape travels in the direction indicated by the arrow 44 in the space adjacent lamp housings 45, 46 and 47, which contain respectively the lamps 13K, 14K and 15K (Figure 1). Corresponding phototubes 13J, 14J and 15J are disposed below the endless tape in alignment with apertures 13W, 14W and 15W in the stationary plate 48. Thus the aperture 13W is used in producing frequency $f_2$, the aperture 14W is used in producing the frequency $f_1$, and the aperture 15W is used in producing the frequency $f_3$, such frequencies being obtained when a corresponding perforation 13V, 14V or 15V, respectively, is in alignment with such apertures. Mechanically, the tape 23 and apertured plate 48 are so fabricated that only one of the apertures 13W, 14W, 15W may be uncovered at any one particular time, and while such apertures are shown in staggered relationship in Figure 5, such staggered relationship is not necessary and they may actually be placed in line so long as the apertures in the tape 23 are aligned so that only one of the apertured portions is uncovered at any one particular time.

Thus it is evident from the above description that the transmitter shown in Figure 1 serves to radiate into space a frequency modulated wave, the modulation components of which include a barker sound developed by transducer 12 program sound developed in microphone 12A and the tone signals of frequencies $f_1$, $f_2$ and $f_3$, which tone frequencies alternately appear as components in the radiated wave. The receiver shown in Figure 2 serves to demodulate the modulation components of the aforementioned frequency modulated wave to reproduce the sound components as well as to perform certain control operations in accordance with the signals of frequencies $f_1$, $f_2$ and $f_3$.

Besides transmitting the aforementioned frequency modulated wave, the station also sends out a scrambled video signal which includes "marquee" information by means of the video antenna 50. Thus the transmission from antennas 11 and 50 contain all of the information required for recreation of the program televised, provided of course that means are present at the receiving station indicated in Figure 2 for unscrambling the received video signals.

So far as certain aspects of the present invention are concerned, the scrambling means at the transmitter and the unscrambling means at the receiver may take different forms, different systems of which are shown in the prior art, but the one preferred is the one shown and claimed in the copending application of Allen D. Hoffmann et al., for Prepaid Entertainment Distribution System, Serial No. 224,622, filed May 4, 1951, now Patent No. 2,764,025 issued October 30, 1956, and assigned to the same assignee as the present invention.

Provisions are present at the transmitting station for sending marquee information and this in general includes means whereby the first five or ten lines of every field or first ten or twenty lines of every frame is devoted to marquee information. For this purpose there are provided two iconoscopes, namely a program iconoscope 12G for purposes of developing program video and a marquee iconoscope 12H for developing marquee video. Both iconoscopes 12G and 12H are fed with vertical synch pulses developed in the vertical synch generator 12J and appearing as 12K (Figure 32).

This synch pulse 12K is a master pulse and recurs at the repetition rate of 60 per second. Such pulse 12K precedes of course the video information which is transmitted in 262½ lines but, in accordance with the present invention, the first ten lines of such 262½ lines are devoted to marquee information. For this purpose the vertical synch pulse 12K developed in the generator 12J is applied, after considerable delay, to appropriately timed electronic switches 12M and 12N, through which the video developed respectively by the iconoscopes 12H and 12G are required to pass before being applied to the mixer stage 12P.

More specifically, synch pulses developed in generator 12J are applied to a so-called "A" phantastron 12R and a so-called "B" phantastron 12S which impose a desired amount of relay and when the delayed triggers from stages 12S and 12R are applied to a flipflop multivibrator 12T, the output of such multivibrator 12T is applied on the one hand to the electronic switch 12M and on the other hand to the electronic switch 12N, so as to produce the result indicated in Figure 32.

In general, the time interval "T" in Figure 32 is determined by the delay imposed by phantastron A, and the delayed pulse from phantastron A "fires" the multivibrator stage 12T. The "B" phantastron 12S imposes a much larger delay to the trigger and the output of such "B" phantastron 12S cuts off current conduction in the multivibrator stage to thereby define the trailing edge of the multivibrator pulse.

Thus, in scanning, the output of the marquee iconoscope 12H is applied exclusively to the mixer stage 12P for the first ten lines and the video output of the iconoscope 12G is applied exclusively for the remaining 252½ lines to the mixer 12P. The marquee video and program video thus applied to the video transmitter 12Q is scrambled by the video scrambling means 12X upon closure of switch 12Y.

Briefly, as explained in detail elsewhere, this marquee video information appearing in the first ten lines is reproduced at the receiver by first shifting or delaying the comparable ten lines at the receiver so that they appear at the center of the cathode ray tube and by blanking the remaining lines.

The receiver shown in Figure 2 includes the conventional antenna 51 coupled to the conventional channel tuner 52. The receiver shown is of the so-called dual-I. F. type using the superheterodyne principle, and the sound frequencies of intermediate frequencies are impressed on the "Sound I. F. and Discriminator" stage 53, while the signals of video appearing at a different intermediate frequency are applied to the "Video I. F. Amplifier" 54. The output of the I. F. amplifier 54 and second detector 56 is applied both to a stationary contact of the single pole double throw relay switch M3 and to the self-keyed unscrambler 57. The output of the unscrambling means 57 is applied to a stationary contact of switch 55 which has its movable contact connected to a stationary contact of switch M3. Normally, the relay switch 55 is in the position shown in Figure 2, and in such case a marquee picture appears on the viewing surface of the cathode ray picture tube 60, since the output of the unscrambling means is applied to the input of the marquee stage 12Z and the output of the marquee stage is applied, in such case, through switch 55 and switch M3 (when a monitor tone provided by the $f_1$, $f_2$ and $f_3$ tone signals are present indicating a "paid" program) to the video amplifier 59. The video amplifier 59 thus supplies marquee video to the CRT60. It is clear that a "free" unscrambled picture may be reproduced since in such case the output of stage 56 is applied through switch M3 to the video amplifier 59 and CRT60. The video relay winding 58 is energized only when certain conditions are realized, i. e., upon a coin acknowledgment, such conditions being described in detail hereinafter, but when such conditions occurs, the unscrambling means 57 is connected directly to the video amplifier and the marquee stage 12Z is disconnected to cause a clear picture of the program to appear on the viewing surface of the tube 60. The means whereby the winding 58 may be energized is now described in detail.

The aforementioned frequency modulated wave, after being detected in the stage 53, is applied to the control grid of tube 61 through the isolating resistance 62 and bandpass filter 63 and resistance 64, for purposes of separating the tone signals of frequencies $f_1$, $f_2$ and $f_3$. Also, for purposes of reproducing the barker sound components developed by the transducer 12 (Figure 1), the output of the stage 53 is applied to the speaker 66 after passing through the switch 58A and low pass filter and audio amplifier stage 67.

It is noted that the relay switch 58A is normally in its position shown in Figure 2 wherein the barker sound is available. However, upon energization of the coin acknowledgment or video solenoid 58A, a bandpass amplifier 12K and AM detector 12L are serially connected between the discriminator 53 and the audio amplifier 67, so as to provide program sound on the speaker 66. The amplifier 12K passes signals having a mean frequency of 45 kilocycles whereby the said carrier of 45 kilocycles is applied to the detector stage 12L. The program sound on such said carrier is thus obtained after demodulation of stage 12L and applied to the audio amplifier 67 and audio speaker 66.

It is noted that the three tone signals have frequencies which lie relatively close to each other, namely, 17.9, 20 and 22 kilocycles respectively. The means described presently for separating these tone signals at the receiver from each other, and from the sound, incorporates important features of the present invention, and briefly comprises the high bandpass filter 63, a so-called jaguar-toothed amplifier, including tube 61 and serially connected high Q (quality factor) tuned circuits 68, 69 and 70, as well as the pickoff stage 71 and the tuned circuits 72, 73.

The bandpass filter 63 includes the series condenser 63A and shunt connected condenser 63B and resistance 63C, and while other high bandpass circuits may be provided for this general purpose of decreasing the amplitude of the sound audio appearing on the control grid of tube 61, the simple one shown herein is preferred for this purpose. As a result of this circuit 63, the frequency characteristics of the waves appearing on the grid of tube 61 have the general appearance shown in Figure 12. Following the signal through, the tuned circuits 68, 69, 70 cause the signal appearing at the anode of tube 61 to have the frequency characteristic shown in Figure 13. The tube 71 is sensitive to the peaks of the voltage appearing on the anode of tube 61, and hence the signal appearing at the grid of tube 71 is modified as indicated in Figure 14. It is observed that the tuned circuits 72, 73 are coupled to the anode of tube 71 and thus have a selective effect on the signals in the manner shown in Figures 15 and 16, where the frequency characteristic of the signal in Figures 15 and 16 represent the condition at points D and E.

For accomplishing the results indicated generally in Figures 12–16, the tubes 61 and 71 are coupled and energized as described in detail presently.

The tube 61 is preferably a triode, and for purposes of increasing the effective plate resistance of the same its cathode is returned to ground through the resistance 80, and its anode is connected to the positive terminal of voltage source 81 through the serially connected tuned circuits 68, 69, 70 and decoupling resistance 82, the circuits 68, 69 and 70 being parallel tuned, respectively, to frequencies $f_1$, $f_2$ and $f_3$. The anode of tube 61 is coupled through condenser 84 to the control grid of tube 71, such control grid being returned to the negative ungrounded terminal of voltage source 86 through resistance 85. The cathode of tube 71 is grounded, and the voltage of source 86 is relatively small, in the order of 3½ volts, for purposes of maintaining tube 71 normally, in its quiescent state, non-conducting and of obtaining grid limiting of the incoming signal. The anode of tube 71 is connected to the positive terminal of source 81 through the coupling resistance 88. The signal developed on the anode of tube 71 is coupled, by means of condenser 89, to three separate circuits, namely, the tuned circuit 72, the tuned circuit 73, and the voltage dividing circuit 90. These circuits 72, 73 and 90 are connected in shunt with each other and have one of their terminals connected to the ungrounded negative terminal of voltage source 92, which serves as a bias voltage for the control grids of tubes 95 and 96, which are coupled respectively to the tuned circuits 72 and 73. Resistance 97 is serially connected to the tuned circuit 73, and likewise resistance 98 is serially connected with the tuned circuit 72. The voltage dividing circuit 90 comprises serially connected resistances 90A and 90B, the junction point of which is connected to the control grid of the monitoring tube 100.

This circuitry thus far described, including filter 63, tubes 61, 71 and tuned circuits 72, 73, causes a transformation of the character shown in Figures 12, 13, 14 and 15. While the filter circuit 63 serves as a pre-filter, a greater portion of the frequency selectivity is obtained using the so-called jaguar-tooth type of amplifier which includes the serially connected circuits 68, 69, 70 and also by the use of tuned circuits 72, 73. While the amplifier tube 61 serves to impart a frequency characteristic of the type shown in Figure 13, i. e., produces a discrimination as to frequency, the following stage 71 introduces discrimination as to amplitude by selecting or picking off the the upper portions of the voltage waves at the anode of tube 61.

Another feature of the tube 71 is that it serves essentially as an amplitude limiter because of limiting action of its control grid, i. e., grid-cathode conduction occurs after the signals appearing on the anode of tube 61 reach a predetermined threshold value, and it is this threshold value which is maintained substantially constant by limiting on the control grid of tube 71. The signals appearing on the anode of tube 71 are further filtered, using the tuned circuits 72, 73, which are tuned respectively to frequencies $f_2$ and $f_1$. Thus, tone signals of frequency $f_1$ are applied to the control grid of record tube 96; tone signals of frequency $f_2$ are applied to the control grid of coin demand tube 95; and tone signals of frequencies $f_1$, $f_2$ and $f_3$ are applied to the control grid of so-called monitoring tube 100.

It is by the use of the tone signals of frequencies $f_1$, $f_2$ and $f_3$, which are applied alternately and in sequence. that the control apparatus shown to the right in Figure 2 is actuated in the following described manner, to cause production of the program video and energization of the recording head 57A, to cause recording, in coded form, of the day, hour and station.

Pulse distribution unit actuated by tone signals $f_1$, $f_2$ and $f_3$

In general, the purpose of the pulse distribution system shown in Figure 2 is to utilize the signals of frequencies of $f_1$, $f_2$ and $f_3$ so that the following functions are performed: (1) Stepping the coin demand solenoid actuated mechanism to a position dictated by the price of a particular program, whereby the user may pay or acknowledge the demanded price and thus cause the production of a program picture and interruption of the marquee picture; (2) recording the program after coincidence has occurred, i. e., after the user has paid or acknowledged the demanded price.

Briefly, the tone signals of frequency $f_2$ cause operation of a stepping mechanism a number of times in accordance with the number of openings 13V in the tape 23 at the transmitter. Each one of the openings 13V represents five cents, so that the series of nine openings represents a program having a value of forty-five cents. In other words, the coin demand solenoid 110 is actuated nine times in response to the nine apertures 13V in the tape 23, to cause the switch arm 110A to be moved over a corresponding number of stationary contacts having numerals 1, 2, 3, 4, 5, 6, 7, 8, 9, 10 and 11 in Figure 18. By this expedient, a visual representation may be made of the amount required in order to produce the program video. In such case, the visual indication would be forty-five cents, and upon inserting the required coins in the coin operated mechanism of the character shown herein in Figures 20–24 and in the copending application of Lorenzo Del Riccio, Serial No. 189,262, filed October 9, 1950, now Patent No. 2,769,024, issued October 30, 1956, and assigned to the same assignee as the present invention, the coin pay solenoids 111, 112 are actuated to step the switch arm 113 to a position where it corresponds with the position of the switch arm 110A, and in such case there is what is termed herein as a coincident condition. In order to allow a person to operate the apparatus not having the required change, i. e., in this instance forty-five cents, but a fifty-cent piece, an arcuate contact arm 110B is mounted on the end of arm 110A to allow the coincident condition to be realized even though the arms 110A, 113 themselves are not rotated the same angular distance by their respective stepping mechanisms. When this coincident condition is achieved, the video solenoid 58 is automatically energized to remove the marquee picture and to cause an unscrambled program picture, and the recording head 57A is likewise energized and a recording is automatically made.

The manner in which these aforementioned results are obtained is now described in relationship to the specific apparatus for accomplishing the same. The signals of frequencies $f_1$, $f_2$ and $f_3$, in the form of coded pulses, are available continuously throughout any one program. They occur alternately, that is, no two ever are present simultaneously. It is noted that the signal of frequency $f_1$ contains the record information, and that the signal of frequency $f_2$ contains the coin demand information, while the tone signal $f_3$ is for monitoring purposes, i. e., for filling in purposes, so that the apparatus receives signals even though there is no $f_1$ or $f_2$ signal present.

A feature of the system is that it is able to operate correctly even though the user tunes in his receiver at any time during motion of the endless tape 23 at the transmitting station.

Another subsidiary feature is that after a complete cycle, that is, after the recording has taken place, the system lock itself out so that it does not respond to further incoming information.

Initially, when the system is turned on or the particular station is tuned in, thyratron tube 100 is fired since tone signals of frequencies $f_1$, $f_2$ and $f_3$ are applied to such tube, and it will remain fired as long as the receiver is tuned to a paid program.

Initially, the system is as shown in its deenergized condition. For matter of convenience, the windings of the relays have certain reference letters, while the switches which are actuated when the corresponding relay winding is energized have the same reference letter but with a different number appended thereto. When turned on to a paid program, relay M is energized and thus makes direct current voltage available through its switch M1 to other parts of the system. The plate load relay W of tube 96 is then supplied with direct current voltage through switch X7 and switch Z5. Under this condition there is no voltage applied to either of the plate loads connected to tube 95.

Thus, the system "sees" nothing until the first $f_1$ pulse fires the thyratron tube 96. When this occurs relay W is energized and a D. C. voltage is applied through switch W4 to relay Z. Relay Z remains energized through its switch Z4, which is normally open and cooperates with switch Z5 in such a manner that the switch Z4 is closed before switch Z5 is opened. Thus, when relay Z is energized switch Z5 interrupts the current to relay W. This, of course, happens very rapidly and relay W is energized just momentarily.

With relay Z thus energized there is now available an alternating current voltage through switch Z3 which is applied to a plate load, i. e., the coin demand solenoid 110 in the plate circuit of tube 95.

Further incoming pulses of frequency $f_1$ have no effect, and the system is now set up to respond to pulses of frequency $f_2$.

Pulses of frequency $f_2$ are now received and fire tube 95, which in turn causes operation of the coin demand solenoid a number of times corresponding to the number of pulses transmitted from the transmitting station, i. e., the number of openings 13V in the tape 23.

As the coin demand solenoid 110 is operated, the coin demand cam 115 is likewise rotated in a step by step manner to cause actuation of switch A, so as to remove one of the grounds on the hold coil Z. The hold coil Z still remains energized, however, through a ground connection provided by switch W6. The switch D is likewise under this condition actuated so as to apply a D.-C. voltage to the relay W through switch X7. Thus, once again tube 96 is in a firable condition. After the $f_2$ cycle, the first $f_1$ pulse to arrive fires tube 96, thereby energizing relay W, which in turn removes the only other ground provided for relay Z, so that now the relay Z becomes deenergized. The system at this stage is in a dormant condition and remains so until the condition of coincidence is met, i. e., until the coin pay solenoid is energized by the user inserting the required coins in the apparatus.

After the coin demand has been acknowledged by inserting the proper coinage or, as shown in succeeding figures, by operating a certain control, the next succeeding $f_1$ pulse causes relay W to be energized, and in such case the coin pay solenoids have complete circuits through the switch W5. When the "coin pay" arm 113 has been ratcheted up to a coincidence point, a D.-C. voltage is applied to relay X, causing this relay to be energized.

When relay X is energized several new conditions are achieved. First, the video solenoid 58 is energized so that the program video is now available for the viewer. Second, there is introduced into the anode circuit of tube 96 through switch X5 a shunt plate load which comprises the recording head 57A. There is, however, no voltage applied to these loads so tube 96 is not in condition for firing; but there is a D.-C. voltage applied to relay Y which is the plate load of tube 95. This voltage is applied through switches X1 and Z1.

Thus, the first $f_2$ pulse after coincidence fires tube 95. This in turn causes energization of relay Y and causes a D.-C. voltage to be applied through switch Y1 to relay Z.

As stated before, relay Z acts as a hold coil through it own (make-before-break) switch Z4. Thus relay Z becomes energized and then opens switch Z1, so that the D.-C. voltage theretofore applied to relay Y is removed. This happens very rapidly and relay Y is energized just momentarily.

The relay Z is energized causing an A.-C. voltage to be applied to the plate loads, i. e., relay W and recording head 57A through switches X2 and Z2 of relay Z, so that tube 96 is in condition for firing. Also at this point tape drive motor 117 becomes energized through contacts $Z_2$ and $X_2$.

Then the next $f_1$ pulse fires tube 96 to cause the particular information, in coded form, to be recorded on tape driven by motor 117. The first $f_1$ pulse which fires tube 96 also causes energization of relay W. At this stage the hold coil of relay W is energized, since there is a D.-C. voltage on the movable contact of switch W2.

At this stage all the contacts of relay W are maintained at a hold condition. Thus a D.-C. voltage is once more applied to relay Y through contacts W1, so that the relay Z is grounded only through switch Y2.

Therefore, with the tube 95 in a firable condition, the first $f_2$ pulse, after the recording cycle, i. e., after the $f_1$ pulses, fires tube 95 and causes energization of relay Y.

With relay Y energized the only other ground, i. e., through switch Y2 of relay Z, is removed and relay Z thus becomes deenergized.

Thus at this time there is no voltage on the anodes of tubes 96 and 95, so that the system is locked out, i. e., it will not respond to further incoming pulses, but of course the tube 100 remains continuously conducting because of the pulses $f_1$, $f_2$ and $f_3$.

At the end of the program at the transmitter, the coded pulses are no longer transmitted, and when this happens tube 100 becomes deionized and relay M becomes deenergized.

With relay M deenergized, the release solenoid 118 is energized through switches M2 and A, so that all mechanical components associated with the coin demand and coin pay solenoids return to initial conditions. Also, the D.-C. voltage is then removed from the system since switch M1 is now open.

It is evident that the above result, i. e., returning of the apparatus to normal condition, may be produced merely by tuning the receiver to a different channel. Thus, with the system cleared, it is ready to repeat the cycle whenever again tuned to a paid program.

*Coin collecting mechanism shown in Figures 20–24*

Figures 20 through 24 illustrate the details of construction of one form of coin collection mechanism which may be used with the system of this invention. The coin collection mechanism shown in these figures constitutes a coin receiver and comprises a coin sorting means for sorting coins according to denomination and conveying those coins from the coin receiving slot to a coin box where they are stored until collected by an authorized agent of the operators of the system. In passing from the coin slot to the coin receiver the segregated coins cause electrical signals to be produced, which signals are representative of the denominations of the coins and are used to energize the coincidence mentioned in connection with Figure 2 and in Figure 17.

The coin sorting mechanism which is indicated generally by the reference character 250 in Figure 20 is secured within a suitable housing 251 in a position to communicate with a coin box 252 mounted in the lower part of the housing 251 in such a way as to be readily removable therefrom. The coin sorter 250 defines at its upper end a coin receiving aperture 253 or coin slot which communicates with a similarly shaped opening 254 formed in the upper surface of the housing 251. The coin slot 253 is dimensioned to freely receive all coins up to and including fifty cent coins and communicates with a series of coin channels which pass downwardly through the mechanism and into the coin box 252. The coin sorter 250 comprises two sets of coin channels, the uppermost set being defined by upper and lower cover plates 255 and 256 held in parallel spaced relation to each other by three triangular spacer plates 257, 258 and 259 disposed between the plates 255 and 256. The plates 257—259 have a thickness slightly exceeding the thickness of a fifty cent coin and are disposed in mutually spaced relation to define a coin channel leading from the coin slot 253 to a discharge opening 260 positioned to allow coins emerging therefrom to drop into the coin box 252.

The coin channel defined between the cover plates 255 and 256 comprises two parts, the upper part extending downwardly from the coin slot 253 and then in inclined fashion downwardly and to the right as viewed in Figure 21, being defined between an upper edge surface 261 of the plate 257 and a lower edge surface 262 of the upper plate 258. At the extreme right hand side of the mechanism as viewed in Figure 21, the coin channel abruptly reverses direction and inclines downwardly and to the left to the discharge aperture 260, this portion of the channel being defined between a lower edge surface 263 of the plate 257 and an upper edge surface 264 of the plate 259.

Twenty-five and fifty cent coins dropped in the coin slot 253 traverse the entire length of the upper coin channel just described, first rolling along the edge surface 261 until the right hand end of that surface (indicated at 265 in Figure 21) is reached. The coins then fall vertically to the lower edge surface 264 and pass along the lower pass of the channel to be discharged through the discharge opening 260.

An electric switch 266 suitably supported upon the plate 256 is so actuated by the passage of the twenty-five cent and fifty cent coins along the upper coin channel as to produce one electrical impulse for the twenty-five cent coin and two electrical impulses for fifty cent coins. The switch 266 is of the rotary snap action type utilizing an actuating spindle 267 and a snap action mechanism of such character that a very small angular displacement of the spindle 267 will actuate the contacts. Switches of this character are commercially available, being manufactured and sold by the Microswitch Corporation of Chicago.

An upper actuating arm 268 is secured to the spindle 267 and is pivotally secured at its upper end to a horizontally extending drag link 269. Conveniently, the arm 268 and drag link 269 are formed of small diameter rod or wire and the pivotal connection of the adjacent ends of these members may be conveniently formed by interengaged eyes formed on the ends of the members as indicated at 270. The right hand of the drag link 269 is bent upwardly in hairpin fashion as represented at 271 in Figure 20, and is passed through a suitable elongated slot 272 formed in the plates 255, 258 and 256.

The dimensions and position of the slot 272 are so selected as to dispose the hairpin portion 271 a distance above the coin channel edge surface 261 sufficiently to allow a twenty-five cent coin to pass freely beneath the hairpin portion 271, but sufficiently close to the edge 261 of the coin channel as to be engaged by a fifty cent coin passing along the channel. The slot 272 is angularly disposed relative to the edge 261 of the coin channel so that when the hairpin portion 271 is engaged by a fifty cent coin, the drag link 269 will be moved to the right to rotate the spindle 267 a distance sufficient to actuate the switch 266. After having moved such a sufficient distance, the hairpin portion 271 becomes spaced from the coin channel edge 261 a distance sufficient to allow the fifty cent coin to pass beneath the hairpin portion 271 and continue its travel along the coin channel.

A lower switch arm 273 is secured to the spindle 267 and is extended upwardly through an arcuate slot 274 formed in the plates 255 and 256 and intersecting the lower pass of the coin channel, the portion of the switch arm 273 which extends across the coin channel being identified by the reference character 275 in Figure 20.

The portion 275 of the switch arm 273 is normally so positioned in the lower pass of the coin channel as to be engaged by coins of either twenty-five or fifty cent denominations. These coins move the switch arm 273 to the left a distance sufficient to actuate the switch 266 and allow the coins to move past the coin engaging portion 275 and emerge from the discharge opening 260.

It will be seen that the deposit of a twenty-five cent coin in the coin slot 253 causes the switch 266 to be actuated once, due to the fact that the twenty-five cent coin passes the upper coin engaging portion 271 without engaging the same, the switch being operated only upon engagement with the lower switch actuator 275. A fifty cent coin, on the other hand, causes two successive actuations of the switch 266 resulting first from engagement with the coin engaging portions 271 and thereafter by engagement with the coin engaging portion 275. Using as a unit of monetary measurement a value of five cents, it will be seen that the switch 266 operates to indicate that a twenty-five cent coin contains one group of five unit valuations, and similarly operates to indicate that a fifty cent coin contains two such groups of five unit valuations.

A second set of coin channels disposed behind and below the upper coin channel is defined by cover plates 276 and 277 which are held in a suitable spaced relation to each other by spacer members indicated generally in Figure 20 at 278. One of these channels extends upwardly from a discharge opening 279 to a position directly behind the lower pass of the upper coin channel, at which point the coin channel is enlarged as by interconnecting members 280 and 281 to form a transition section connecting the coin channel with a rectangular aperture 282 formed within the lower cover plate 256 of the upper coin channel positioned to communicate with the lower pass of the upper channel.

As is indicated by the dimension line bearing the legend "5 cents," the vertical dimension of the rectangular aperture 252 is made substantially equal to, but slightly exceeding, the diameter of a five cent coin so that a five cent coin rolling along the lower edge 264 of the coin channel may fall through the aperture 282. The vertical dimension of the aperture 282 is made less than the diameter of a twenty-five cent coin so that only five cent coins may fall through the aperture 282.

Five cent coins passing through the aperture 282 are thus segregated from the twenty-five and fifty cent coins and are caused to pass into the coin box 252 through the discharge opening 279 instead of the discharge opening 260 from which the twenty-five cent and fifty cent coins emerge.

A second rotary snap action switch 283 suitably secured to the plate 256 is arranged to be actuated by the five cent coins. The switch 283 may be identical with the switch 266 above described, and may include a spindle 284 to which is attached a switch arm 285 extending downwardly and to the left from the switch 283 as viewed in Figure 21. At the lower end of the arm 285 there is attached an auxiliary arm 286 pivotally joined in any suitable fashion to the lower end of the arm 285 and having an upwardly turned coin engaging portion 287 extending through a vertical slot 288 in the lower portion of the coin channel communicating with the discharge opening 279.

A five cent coin passing through the aperture 282 and along the five cent coin channel engages the switch arm portion 287 to move the same downwardly along the slot 288. This results in a counterclockwise rotation of the spindle 284 and actuates the switch 283. The side edges of the coin channel leading to the discharge opening 279 are terminated short of the lower end of that channel as is indicated at 289 and 290 in Figures 21 and 22. This allows a five cent coin to escape through the gap between the switch arm portion 287 and the lower end 290 of the side edge of the channel when the switch arm portion 287 has been moved a distance sufficient to actuate the switch 283.

A similar mechanism employing a suitably sized aperture 291 communicating with the upper pass of the upper coin channel is used to segregate the ten cent coins and convey those coins to a coin channel 292 defined between the plates 276 and 277. The channel 292 passes downwardly from the aperture 291 and curves to the left to connect with the five cent coin channel at a point above the switch arm portion 287. An arcuate slot 293 communicating with the channel 292 receives an upwardly turned portion 294 of the switch arm 285 so that a ten cent coin passing downwardly along the channel 292 moves the switch arm 285 and spindle 284 in a counterclockwise direction. When the arm 285 has been moved a distance sufficient to cause actuation of the switch 284, the ten cent coin is allowed to escape through the space between the coin engaging portion 294 and the upper terminal edge 295 of the coin channel 292. After passing that terminal edge, the ten cent coin engages the switch arm portion 287 to cause a second and subsequent operation of the switch 283, the coin finally escaping through the gap between the switch arm portion 287 and the lower edge 289 of the coin channel.

It is thus seen that the ten cent coins are also segregated from the twenty-five cent and fifty cent coins and are caused to operate the switch 283 twice by reason of the successive engagement of the coin with the switch actuators 294 and 287. The switch 283 thus functions upon the deposit of a five cent coin and the resulting single actuation of the switch to indicate that a five cent coin contains one unit of monetary value, and also serves to indicate as a result of the two operations thereof caused by the deposit of a ten cent coin, that such ten cent coin contains two units of monetary value.

The way in which the indications given as described by the switches 266 and 283 are used to integrate and indicate the total monetary value of all coins deposited is explained in detail in connection with the coin integrator and coin interlock mechanism illustrated in Figures 7 through 11.

The coin sorting device 250 includes also a mechanism for rejecting one cent coins. This mechanism comprises a rectangular aperture 296 sized to pass one cent coins but to exclude five cent coins and communicating with a coin channel 297 defined between the plates 276 and 277. The coin channel 297 extends downwardly and to the right as viewed in Figure 21 and communicates with a discharge opening 298 which is aligned with a suitably shaped opening in the outer housing 251. Thus one cent coins deposited in the coin slot 253 pass along the upper coin channel 261 until they reach the aperture 296. By reason of the sizing of the aperture 296, the one cent coins fall through that aperture and into the coin channel 297 by which they are led to the discharge aperture 298 and returned to the person depositing such coins.

*Coin demand and coin pay mechanism shown in Figures 7–11*

The coin integrating mechanism which is operated by the coin switches 266 and 283 is illustrated in Figures 7 through 11.

As is best seen in Figures 8 and 9, the apparatus comprises a pair of spaced side plates 310 and 311 held in parallel spaced relation to each other by a transverse base plate 312 and a plurality of transversely extending spacer members such as are shown at 313. A transversely extending indicating shaft 314 is suitably journaled for rotation in the side plates 310 and 311. One end of the shaft 314 protrudes beyond the face of the side plate 310 and has secured thereto as by means of a pin 315 an indicating disk 316 upon which indicia 317 (Figure 10) are inscribed at suitable angular intervals in a circumferentially extending progression located near the peripheral edge of the disk. The indicia 317 are representative of the integrated monetary value of coins deposited in the coin slot 253.

The entire mechanism is enclosed within a suitable housing 318 formed for example of sheet metal. The front face of the housing 318 is provided with a viewing aperture or window 319 disposed in a position to allow the indicia 317 to be viewed one at a time through the window 319. By rotating the shaft 314 to a position representative of the total value of coins deposited, that monetary value is indicated by the positioning of the appropriate indicia 317 behind the window 319.

Mechanism is provided for rotating the shaft 314 to an angular position representative of the total monetary value of coins deposited. This mechanism includes a pair of solenoids 111 and 112 secured in an upright position by any suitable means to the base plate 312. Each solenoid includes a plunger 322 which is urged upwardly by means of a compression spring (not shown) disposed within the bore of the solenoid coil below the lower end of the plunger 322. The upper position of each of the plungers is defined as by means of stop screws 323 adjusted to provide a stroke of predetermined length for each of the solenoids 111 and 112.

The plunger of the solenoid 112 is connected by means of a drag link 324 to the outer end of an oscillatable arm 325 which is journalled upon the shaft 314 for oscillating movement relative thereto by means of a hub portion 326 surrounding the shaft 314 and freely rotatable thereon. An actuating arm 327 extends outwardly from the hub 326 at a location diametrically opposite the oscillatable arm 325. To the outer end of the actuating arm 327 there is pivotally mounted an arcuate pawl member 328 which is normally urged upwardly by means of a tension spring 329 connected between the arm 325 and an arcuately extending tail piece portion 330 of the pawl 328. The pawl 328 includes a pawl tooth 331, adapted to operatively engage the teeth of a ratchet wheel 332.

The ratchet wheel 332 is secured as by means of axially extending pins 333 to a hub member 334 which is in turn made fast to the shaft 314 as by a cross pin 335. With this construction an angular movement of the oscillatable arm 325 in a counterclockwise direction as viewed in Figure 7 through an angle equal to the angular spacing of the teeth of the ratchet wheel 332 will result in imparting a corresponding angular rotation to the shaft 314. The angular spacing of the indicia 317 is selected to correspond with the angular spacing of the teeth of the ratchet wheel, so that by so moving the shaft 314, one of the indicia 317 may be moved out of the window 319 and replaced by the next higher indicia.

The arm 325 is spring-urged to its normal position as by means of a tension spring 336 and clockwise movement of the arm 325 under the influence of the spring 336 is permitted by reason of the pivotal mounting of the pawl 328. During such clockwise movement of the arm 325 the ratchet wheel 332 is held stationary by means of a detent 337 mounted upon the upper end of the plunger 338 of a release magnet 339.

The solenoid 112 is connected in circuit with the coin switch shown at 266 in Figure 17, so that the solenoid 112 will be energized once for each five cent coin deposited. The length of stroke of the solenoid 112 is adjusted to cause a unit angular movement of the ratchet wheel 332 in response to each energization of the solenoid 112.

The plunger of the solenoid 111 is also connected to the oscillatable arm 325, a drag link 340 being employed for this purpose. The drag link 340 is pivotally connected to the oscillatable arm 325 at a point intermediate the ends thereof. The length of stroke of the solenoid 111 and the location of the pivotal attachment of the drag link 340 to the oscillatable arm 325 are so chosen as to cause a single stroke of the solenoid 320 to result in the moving of the ratchet wheel 332 through five of its unit angular displacements represented by the spacing of the ratchet teeth.

The solenoid 111 is connected in circuit with the second coin switch 283 which is shown in Figure 17. This switch is operated once by the deposit of a twenty-five cent coin and twice by the deposit of a fifty cent coin. Since the solenoid 111 operates to move the ratchet wheel 332 through five of its unit angular displacements it will be seen that the deposit of a twenty-five cent coin moves the ratchet wheel 332 through five notches, whereas, the deposit of a fifty cent coin will cause the ratchet wheel 332 to be moved ten spaces.

It will be seen that the structure thus far described cooperates with the coin separating mechanism described in such a way as to indicate at the viewing aperture 319 the total monetary value of all coins deposited in the coin slot 253.

The clearing magnet 339 corresponds to the release magnet 339 shown in Figure 17. By reference to Figure 7 it will be seen that energization of the clearing magnet 339 will move the plunger 338 thereon downwardly so as to disengage the detent 337 from the ratchet wheel 332. At the same time, the operating pawl 328 is moved downwardly to disengage the tooth 331 from the ratchet 332, this operation being obtained by passing the pawl tail piece 330 through a suitable aperture formed in the detent 337 as is best shown in Figure 9.

It will be seen that energization of the clearing magnet 339 releases the ratchet wheel 332 so as to render the same free to be rotated to an initial position indicating zero at the viewing aperture 319. Such resetting rotation of the ratchet wheel 332 is obtained by means of a spiral spring 342 of the clock spring type which is mounted within a suitable housing 343 secured as by the pin 333 to the hub member 334. One end of the spring 343 is secured to the housing 342 and the other end of the spring is secured as by means of a pin 344 to a fixed contact plate 345 held in parallel spaced relation to the side plates 310 and 311 by the spacer members 313 hereinbefore mentioned.

The clock spring 342 operates upon release of the pawl 328 and detent 337 to move the shaft 314 in a counterclockwise direction to its initial position, in which position the figure "zero" is presented at the viewing aperture 319.

The coin interlock 91 comprises a pair of movable contacts, one of which is movable to a position representative of the price of the program, and the other of which is movable to a position representative of the monetary value of the coins deposited. Operation of the unscrambler is permitted when both contacts occupy identical positions. In the apparatus shown in Figures 7 through 11, the contact which is movable to a position representative of the monetary value of the coins deposited is shown at 113 and comprises a spring contact arm secured to a driving disk 351 which is in turn secured to the hub 334 by the aforementioned pins 333. The spring contact 113 is thus caused to move with the shaft 314, and is therefore caused to assume an angular position representative of the total amount of money indicated by the coin integrating and indicating apparatus.

During its angular movement the contact 113 traverses a series of fixed contact points 352 mounted upon the contact support 345 and extending completely through that support so as to present exposed surfaces on both faces of the support. The contacts 352 are angularly spaced in accordance with the angular spacing with the teeth of the ratchet wheel 332 so that the contact 113 is caused to move from one fixed contact 352 to the next adjacent contact for each five cents of monetary value registered by the coin integrating mechanism.

The contact which is movable to a position representative of the price of the program is indicated at 110A, and comprises a spring arm which is substantially identical to the contact arm 113. The spring contact 353 is secured to a driving disk 354 which is in turn secured as by means of a plurality of longitudinally extending pins 355 to a sleeve member 356 which is mounted upon the shaft 314 for free rotation relative thereto. The pin 355 serves to secure also to the sleeve 356 a ratchet wheel 357 which is identical to the ratchet wheel 332 previously described. The ratchet wheel 332 is arranged to be rotated by the energization of a solenoid 110.

The solenoid 110 is connected to drive the ratchet wheel 357 through a mechanism which is similar in all material respect to the mechanism used for driving the ratchet wheel 332, such mechanism including a drag link 359, oscillatable arm 360, pawl 361, and holding detent 362 arranged to be actuated by a clearing magnet 363. The teeth of the ratchet wheel 357 are given the same angular spacing as is employed on the ratchet wheel 332, and the stroke of the solenoid 110 is arranged to cause the ratchet wheel 357 to be advanced one tooth for each energization of the magnet 110.

The solenoid 110 comprises the price demand solenoid described with reference to Figure 17, in which description it was pointed out that the price demand solenoid 110 was energized by signals transmitted from the transmitting station once for each five cent unit of value of the price of the program being transmitted. The pulsing of the demand solenoid 110 thus causes the arm 110A to be moved into engagement with that one of the contact buttons 352 which is representative of the established price of the program. When the corresponding amount of money is deposited in the coin slot 253, the other switch arm 113 is moved to an identical angular position to engage the opposite face of the same contact button carried by the contact support 345. The coincidence in angular position of the switch arms 113 and 110A thus completes an electric circuit.

In order that energization of the clearing magnet 363 may cause the return of the switch arm 353 to its initial position a clock spring mechanism 364 is employed which is similar in all material respect to the clock spring mechanism 342 used for returning the switch arm 113.

While in the apparatus heretofore described the coin demand acknowledgement is accomplished by the user inserting the demanded coinage in a coin slot, the acknowledgement may be made in the modified arrangements in Figures 25 and 26 by the user causing a switch to be closed. In such modifications a recording is of course made from which information may be obtained for assessing the subscriber the amount of the acknowledged program. In the modified arrangement shown in Figure 25, the video solenoid 58, recording head 57A and tape driving motor 117 is of the character previously described.

The apparatus in Figure 25 is responsive to the $f_1$, $f_2$ and $f_3$ pulses as previously described, such pulses being applied as heretofore to the control grids of the thyratron tubes 95, 96 and 100, as indicated. It is observed that in the quiescent state, i. e., in the absence of any $f_1$, $f_2$ and $f_3$ pulses, there is no current flow from either the A.-C. source 520 or from the D.-C. source 521. However, upon the appearance of either an $f_1$, $f_2$ or $f_3$ pulse, the thyratron tube 100 is fired to cause a flow of current through the solenoid winding 504 and across the indicator lamp 522, such current flowing from the A.-C. source 520 and thus serving, by means of the lamp 522, to provide a visual indication to the operator that a paid program is being transmitted, although he may be likewise appraised of that fact since at this time there is a marquee picture on the picture tube and he hears "barker" sound.

Such winding 504 and lamp 522 remain energized during the negative half of the cycle of the voltage supplied from source 520, due to the action of the momentary holding circuit which comprises a serially connected condenser 524 and resistance 525. This is true even though there is a time interval between the occurrence of successive pulses applied to the control grid of tube 100.

In a study of the circuit shown in Figure 25 it should be borne in mind that the different relay windings have a unique reference numeral, and the switches operated upon energization of such windings have the same unique reference numeral but with a characteristic letter appended thereto. Thus, for example, when winding 504 is energized, switch 504A is actuated. When switch 504A is actuated, a direct current voltage appears on the control lead 527, thus conditioning the control for operation by the user who has convenient access to the normally open spring biased switch 506 which may be of the type usually used in doorbell ringing installations. Upon momentary closing of switch 506 the relay winding 503 is energized to thereby cause actuation of the normally open switches 503A, 503B and 503C. The switch 503C is in parallel with switch 506 and thus serves as a sealing or hold switch for the winding 503. At substantially the same time the video solenoid 58 is energized through switch 503B so that an unscrambled picture appears on the picture tube. Also, at substantially the same time, a direct current voltage is supplied through switch 503A to the anode of tube 95 and through relay winding 500, so that the tube 95 is conditioned for firing by the next succeeding $f_2$ pulse.

Upon the occurrence of such next succeeding $f_2$ pulse, an energizing current flows through the relay winding 500 to thereby actuate the related normally open switch 500A and normally closed switch 500B. This actuation of switch 500B merely results in opening a short circuit across switch 501B, while closure of switch 500A results in application of D.-C. voltage to the solenoid winding 502 which is caused thereby to actuate the related normally open switches 502A and 502B and normally closed switch 502C. It is noted that the switches 502B, 502C provide a make-before-break combination in that switch 502B makes or closes a circuit before switch 502C breaks or opens a circuit. Closure of switch 502A results in energization of the tape driving motor 117 and the application of A.-C. voltage to the anode of tube 96 through a parallel circuit, comprising in one arm thereof the recording head 57A and voltage dropping resistance 57R, and including in the second arm thereof the relay winding 501. The tube 96 is thus in condition for firing by the next succeeding $f_1$ pulse appearing on the control grid of tube 96.

The resulting flow of current through the recording head 57A causes a recording to be made; however, it should be noted that upon energization of the relay 501, the related normally open switches 501A and 501C are closed, while the normally closed switch 501B is energized. Closing of switch 501A results in energization of the hold coil 501H with direct current, such hold coil 501H being magnetically associated with the winding 501 to maintain the related switches in actuated position regardless of whether or not the main winding 501 is energized. However, opening of switch 501B causes the winding 502 to be deenergized, and substantially simultaneously therewith closure of switch 501C results in application of a direct current voltage to the anode of tube 95 through relay winding 500, thereby conditioning tube 95 for firing by the next succeeding $f_2$ pulse, while at this stage the tube 96 is prevented from being fired because of the switch 502A which assumes its normal open position upon deenergization of winding 502.

Under these conditions, once the tube 95 is fired, it remains conducting even in the absence of $f_2$ pulses, so that the circuit is locked out, i. e., non-responsive to further incoming $f_1$ or $f_2$ pulses (except of course such $f_1$ and $f_3$ pulses are responsible for maintaining current flow through the monitoring relay 504). Upon cessation of the pulses, occasioned as for example by stoppage or removal of the tape 23 (Figure 6) at the transmitting station, or upon tuning the receiver (using the manual tuning knob shown in Figure 2), the relay winding 504 is deenergized, thereby allowing switch 504A to open and causing the control system to be restored to its initial condition. Assuming that such cessation were caused by tuning the receiver for reception from one station to a second broadcast station, and assuming further that the second station was broadcasting a paid program, $f_1$, $f_2$ and $f_3$ pulses would of course appear in such case on the control grid of tube 100 to cause the indicating lamp 522 to be illuminated. If the user desired an unscrambled picture from such second station, it would be necessary for him only to close the switch 506 to cause repetition of the above mentioned cycle of events.

The modified arrangement shown in Figure 26 constitutes relatively slight modifications of the control shown in Figures 2 and 17, and serves to allow acknowledgement of a coin demand without the necessity of the user using coins for that particular purpose. One feature of the apparatus is that it provides the user with a visual indication of the coin demand when, as more fully described herein, the apparatus shown in Figures 7–11 (as modified by the arrangement shown in Figures 27–28 herein) is utilized. Briefly, the circuit shown in Figures 2 and 17 is modified in the following respects; switch W5 is not utilized and is omitted; also, the coin switches 266, 283 and associated coin pay solenoids 111, 112 are not used and are omitted; also, the coin actuated arm 113 is not energized; also, relay X is not energized through the coin demand arm 110A but has one of its terminals connected directly to an ungrounded terminal of the D.-C. voltage source; further, the coin pay relay solenoid 363 is omitted. However, instead of returning one terminal of the relay X directly to ground, as shown in Figure 17, it is returned to ground through a manually operated switch 530 located in a convenient position for operation by the user. Such manually operated switch 530 is normally open and is shunted by an additional normally open relay switch X8. By this expedient the user, first observing the coin demand obtainable from the apparatus shown in Figures 27 and 28, may acknowledge such coin demand by merely closing the switch 530. Upon closure of such switch 530 the control circuit is set into operation to cause clearing of the picture appearing theretofore as a scrambled picture on the picture tube, and further producing a recording to provide information useful in later assessing him for the program acknowledged.

Referring to Figure 26, initially the system is as shown in its deenergized condition. For matter of convenience corresponding windings in Figures 17 and 26 and related switches have the same reference characters. In Figure 26, when the receiver is turned on to a paid program, relay M is energized and thus makes D.-C. voltage available through its switch M1 to other parts of the system. The plate load relay W of tube 96 is then supplied with D.-C. voltage through switch X7 and switch Z5. Under this condition there is no voltage applied to either of the plate loads connected to tube 95.

Thus, the system "sees" nothing until the first $f_1$ pulse fires the thyratron tube 96. When this occurs relay W is energized and a D.-C. voltage is applied through switch W4 to relay Z. Relay Z remains energized through its switch Z4, which is normally open and cooperates with switch Z5 in such a manner that the switch Z4 is closed before switch Z5 is opened. Thus, when relay Z is energized switch Z5 interrupts the current to relay W. This, of course, happens very rapidly and relay W is energized just momentarily.

With relay Z thus energized there is now available an alternating current voltage through switch Z3 which is applied to a plate load, i. e., the coin demand solenoid 110 in the plate circuit of tube 95.

Further incoming pulses of frequency $f_1$ have no effect, and the system is now set up to respond to pulses of frequency $f_2$.

Pulses of frequency $f_2$ are now received and fire tube 95, which in turn causes operation of the coin demand solenoid a number of times corresponding to the number of pulses transmitted from the transmitting station, i. e., the number of openings 13V in the tape 23.

As the coin demand solenoid 110 is operated, the coin demand cam 115 is likewise rotated in a step by step manner to cause actuation of switch A so as to remove one of the grounds on the hold coil Z. The hold coil Z still remains energized, however, through a ground connection provided by switch W6. The switch D is likewise, under this condition, actuated so as to apply a D.-C. voltage to the relay W through switch X7. Thus, once again tube 96 is in a firable condition. After the $f_2$ cycle the first $f_1$ pulse to arrive fires tube 96, thereby energizing relay W, which in turn removes the only other ground provided for relay Z, so that now the relay Z becomes deenergized. The system at this stage is in a dormant condition and remains so until the condition of coincidence is met, a coin demand having been made and being visually displayed, as observable by the apparatus shown in Figures 27 and 28. The control circuit remains unaffected until the user, if he so desires, acknowledges such coin demand by operating the normally open switch 530, which is of the spring biased momentary closing type in a conveniently accessible location.

After the coin demand has been acknowledged by operation of switch 530, a continuous current flows from the D.-C. voltage source through the relay winding, to cause, among other things, the closure of the normally open switch X8, such switch X8 being in parallel with switch 530 so that the winding X remains energized even though the switch 530 is allowed to assume its normally open position.

When relay X is thus energized several new conditions are achieved. First, the video solenoid 58 is energized so that the program is now intelligible for the viewer. Second, there is introduced into the anode circuit of tube 96 through switch X5, a shunt plate load which comprises the recording head 57A. There is however no voltage applied to these loads so tube 96 is not in condition for firing; but there is a D.-C. voltage applied to relay Y, which is the plate load of tube 95. This voltage is applied through switches X1 and Z1.

Thus, the first $f_1$ pulse after coincidence fires tube 95. This in turn causes energization of relay Y and causes a D.-C. voltage to be applied through switch Y1 to relay Z.

As stated before, relay Z acts as a hold coil through its own (make-before-break) switch Z4. Thus relay Z becomes energized and then opens switch Z1, so that the D.-C. voltage theretofore applied to relay Y is removed. This happens very rapidly and relay Y is energized just momentarily.

The relay Z is energized causing an A.-C. voltage to be applied to the plate loads, i. e., relay W and recording head 57A through switches X2 and Z2 of relay Z, so that tube 96 is in condition for firing. Also at this point tape drive motor 117 becomes energized through contacts Z2 and X2.

Then the next $f_1$ pulse fires tube 96 to cause the particular information, in coded form, to be recorded on tape driven by motor 117. The first $f_1$ pulse which fires tube 96 also causes energization of relay W. At this stage the hold coil of relay W is energized, since there is a D.-C. voltage on the movable contact of switch W2.

At this stage all the contacts of relay W are maintained in a hold condition. Thus a D.-C. voltage is once more applied to relay Y through contacts $W_1$, so that the relay Z is grounded only through switch Y2.

Therefore, with the tube 95 in a firable condition, the first $f_2$ pulse, after the recording cycle, i. e., after the $f_1$ pulses, fires tube 95 and causes energization of relay Y.

With relay Y energized, the only other ground, i. e., through switch Y2 of relay Y, is removed and relay Z thus becomes deenergized.

Thus at this time there is no voltage on the anodes of tubes 96, so that the system is locked out, i. e., it will not respond to further incoming pulses, but of course the tube 100 remains continuously conducting because of the pulses $f_1$, $f_2$ and $f_3$, and tube 95 remains in a conducting or "fired" condition.

At the end of the program at the transmitter, the coded pulses are no longer transmitted, and when this happens tube 100 becomes deionized and relay M becomes deenergized.

With relay M deenergized, the release solenoid 118 is energized through switches M2 and B, so that all mechanical components associated with the coin demand and coin pay solenoids return to initial conditions. Also, the D.-C. voltage is then removed from the system since switch M1 is now open.

It is evident that the above result, i. e., returning of the apparatus to normal condition, may be produced merely by tuning the receiver to a different channel. Thus, with the system cleared, it is ready to repeat the cycle whenever again tuned to a paid program.

With respect to Figure 30, there is shown therein the tape driving motor 117 energized in either one of the three previously described control circuits, such motor 117 serving to drive a tape 535 past a recording head 57A for purposes of obtaining a recording representative of the number, relative spacing and shape of the so-called $f_1$ apparatus in Figure 6. The tape 535 may, for example, be of the character described in the aforementioned application Serial No. 189,262, for producing magnetic recordings thereon of the character shown in Figure 29. It will be observed that the magnetic recordings shown in Figure 29 hatched or shaded bear a definite correlation with the size, shape and spacing of the corresponding apertures $f_1$ in Figure 6. The tape 535, after being subjected to impulses impressed on the recording head 57A, is developed using in the development process iron powder and mucilage of the gum arabic type, so that such recordings appear in visual form. The tape 535 may be passed through an electronic accounting machine for purposes of obtaining a speedy record of the day, hour and channel appertaining to the recorded or acknowledged program.

The motor 117 is preferably of the synchronous type so that a constant speed recording is obtained, and likewise the motor at the transmitting station is preferably a synchronous motor, such synchronous motor of course being characterized by its constant speed operating in timed relationship with alternations of the supply current or voltage distributed from a public utility.

While Figure 1 shows the use of apertured tapes and associated photoelectric means for developing tone signals, the present invention is deemed not critical as to such arrangement, for the different tone signals occurring recurrently and alternately may be developed by other means. Such other means may, for example, comprise a magnetic tape having the different tone signals $f_1$, $f_2$ and $f_3$ previously recorded thereon in predetermined spaced relationship, so that when and as such tape travels past associated reproducing head or heads, tone signals are developed and used as previously mentioned to frequency modulate the transmitted wave.

From the foregoing description, and description hereinafter with respect to Figure 40, it is evident that the coin demand established by the incoming signals may be acknowledged in different manners, i. e., by inserting the proper coinage or coinage above the demanded amount in a coin slot, or, as shown in the modifications in Figures 25 and 26, a coin demand acknowledgement may be made without the use of coins, i. e., by the user actuating a switch, and in each instance the result is the same; and in Figure 40 a "coin acknowledgement" may be made without any positive action on the part of the subscriber or user, i. e., by merely allowing time to elapse. It is therefore understood that the term "acknowledgement of a coin demand" is not to be restricted, either in the specification or in the appended claims, to the use of coin operated apparatus, since means are shown herein for causing such acknowledgement without the use of coin operated apparatus.

While the system heretofore described uses three tone signals, i. e., tone signals of frequencies $f_1$, $f_2$ and $f_3$, it is evident, from the teachings and apparatus disclosed herein, that certain inventive concepts developed herein may be practiced using only two tone signals, i. e., one representative of the coin demand and the other representative of the day, hour and channel information. Further, it is understood that the system may be operated using one tone signal, provided such one tone signal, by its amplitude, duration and/or spacing with respect to other tone signals, is used as a medium for conveying information. In other words, in such a system, the presence of a tone signal itself constitutes information of the $f_1$ type, while the relative amplitude, duration and/or spacing of such tone signal correspond to information conveyed by the $f_2$ pulses.

A feature not to be overlooked in the above described systems is that acknowledgement is lost when the receiver is tuned to receive signals from a different station, using the so-called manual tuning knob for that purpose shown in Figure 2. Upon tuning from one channel to another channel, the pulse distribution system is restored to its initial normal condition, and this is true whether or not (as in the case of the coin operated apparatus) the coincident condition has been realized. By this expedient acknowledgement made as to one program may not be credited to a second program to which the receiver is subsequently tuned.

Another important feature of the arrangement shown herein is that no coin demand is made unless the transmitted signal is sufficiently good at the particular situs of the receiver. In this respect, while it is noted that the coin demand information is transmitted over the sound channel, and the video information is transmitted over the related video channel, it is realized that the sound and video signals both undergo substantially the same attenuation and are subjected to substantially the same interfering effects, so that in the event that the sound signal is below par, the video signal is likewise below par or insufficiently good for reference purposes.

Figures 27, 28 and 31 serve to illustrate the manner in which the previously described comparator may be modified to produce a visual indication both of the coin demand and the amount paid. For that purpose, as shown in Figure 27, the arm 610, which is stepped into different positions by a coin pay solenoid, is mounted on the shaft 604 which carries the disc 612. The disc 612 has indicia printed on the periphery thereof, such indicia being visible through the coin pay aperture 601 so that the user is provided with a visual indication of the amount placed in the coin slot. Similarly, a disc 607 is provided with indicia thereon visible through a coin demand aperture 602 so that the user is provided with a visual indication of the coins demanded. The disc 607 is ratcheted around to different positions by the coin demand solenoid 615 associated with the demand release solenoid 620 functioning in the same manner as the previously described coin demand and release solenoids. The disc 607 is mounted on the hollow shaft 608 through which the rotatable shaft 604 passes. The rotatable hollow shaft 608 is suitably journaled for rotation and carries with it the coin demand arm 625 which is adapted to contact the overage plate 626 secured to the coin pay arm 627. Such arm or disc 627 of course rotates with the shaft 604 and when, as shown, the arm 625 engages the overage plate 626, a coincident condition is achieved.

The marquee represented at 12Z in Figure 2 is shown in detail in Figure 33. In general, the purpose of this marquee 12Z is to render visibly only that information contained in the first ten or twenty lines of a transmitted picture, the marquee functioning to center such ten or twenty lines on the face of the cathode ray tube at the receiver and to blank out the remaining lines.

For this purpose, the marquee 12Z includes a delay multivibrator stage 812 which has applied thereto vertical synch pulses 813 from the vertical synch section. The output of the delay multivibrator constitutes a pulse 814 which is returned to the vertical synch section. The general purpose of the delay multivibrator 812 is to delay the vertical synch pulses applied to the vertical deflecting coil of the cathode ray tube in an amount equal in time to the appearance of the first line of the picture to the appearance of the middle line of the picture.

Figure 34:
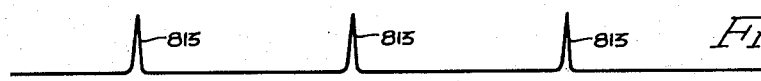
Figure 35:
Figure 36:
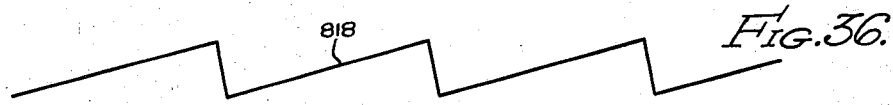

This delay is represented in Figures 34 and 35, the pulses 813 being represented in Figure 34 and the output pulses being represented at 814 in Figure 35. These delay pulses 814 initiate vertical sweep currents of the character illustrated at 818 in Figure 36. It is this sawtooth sweep current 818 which is applied to the vertical deflection coil of the cathode ray tube.

The unscrambler 12Z also includes a delay network 820, a one-shot multivibrator 821 for effecting operation of an electronic switch or gating circuit 822. Input pulses 813 are delayed in the delay network 820 before being applied to the one-shot multivibrator, the delay being commensurate with the time "T" in Figure 32. The one-shot multivibrator develops a gate which has a time duration equally substantial to ten lines corresponding to the ten lines indicated in Figure 32. The output of the one-shot multivibrator stage 821 opens an electronic switch 822 for the duration of such gate i. e., such ten lines whereby the output from the unscrambler 57 is applied to the switch 55 only during such ten lines.

Figure 37:
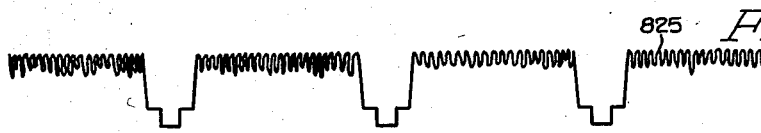
Figure 38:
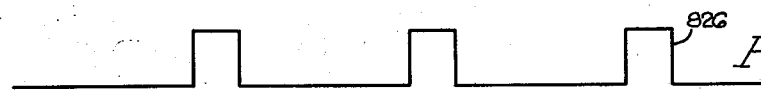
Figure 39:
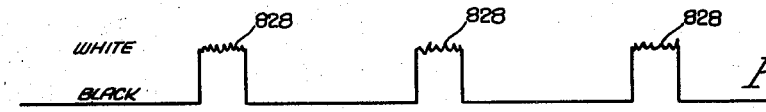

Thus, while the composite signal, including video and vertical synch pulses of the character illsutrated in Figure 37 at 825 are applied to the electronic switch 822, the gate 826 (Figure 38) developed by the multivibrator stage 821 and applied to the electronic switch 822 allows passage of only portion of the video represented at 828 in Figure 39, i. e., the video corresponding to the first ten or twenty lines.

*Modified arrangement shown in Figure 41*

The arrangement shown in Figure 41 serves to allow a subscriber or user, once he has made a coin acknowledgment of a particular paid program, to receive free or paid programs on other channels, and thereafter to retune his receiver back to receive the particular program for which he has already paid, without making an additional coin acknowledgment.

For this purpose, paid programs, as well as free programs, are received on antenna 2865. In addition, each one of the stations sending out paid programs has a unique tone signal. Thus, Chanel 2, sending out paid programs, has a characteristic tone signal of 30 kilocycles; Channel 3, sending out paid programs has a characteristic tone signal of 35 kilocycles; and Channel 4, sending out paid programs, has a characteristic tone signal of 40 kilocycles. Such characteristic tone signals of 30, 35, and 40 kilocycles comprises a frequency modulation component on the sound carrier.

The sound carrier signals, thus normally received on antenna 2865, are applied through a special filter network 2800 to the input of the tuner 2841. This filter 2800 allows the transfer of sound carriers from the antenna 2865 to the tuner 2841 in the different allocated channels, but prevents the transfer of the associated video carrier waves from the antenna 2865 to the tuner 2841.

The output of the tuner 2841, after amplification in the I. F. amplifier stage 2896, is applied to the discriminator stage 2898. The discriminator stage 2898 has associated therewith resonant relays 3002, 3003 and 3004, resonant at 30 kilocycles, 35 kilocycles and 40 kilocycles respectively, so as to correspond with Channels 2, 3 and 4. Energization of relay 3002 results in closure of switches 3002A; similar energization of relay 3003 results in closure of switch 3003A; energization of relay winding 3004 results in closure of switch 3004A.

Assuming that the tuning knob 2860 is in the Channel 2 position, only winding 3002 is energized. At the same time, the $F_1$, $F_2$ and $F_3$ signals developed in the discriminator stage 2898 and applied to comparator stage 3007, results in the establishment of a coin demand, as described elsewhere herein in connection with Figure 2.

Upon acknowledgment of such coin demand, the coincidence relay winding 58 is energized to thereby actuate the switches 2058A, 2058B, and 2058C. Thus, when the tuner 2841 is tuned to Channel 2 and a coin acknowledgment is made, the resonant relay winding 3012 is energized to thereby cause closure of switches 3012A and 3012B, by means associated with the resonant coil 3012 as described below.

Closure of such switch 3012B results in application of program video, program sound and $F_1$, $F_2$ and $F_3$ signals to the lead 3020, through the series resonant circuit 2801 corresponding to Channel 2.

Closure of switch 3012A, which is in parallel with switches 2058A and 3002A, serves to seal the winding 3012, to maintain the same energized so long as the 30 kilocycle signal, appearing as a frequency modulation component, is being transmitted from the Channel 2 station, such 30 kilocycle signal being obtained after demodulation in the demodulator stage 2805. Thus, such 30 kilocycle signal is present on the lead 2806 so long as the paid program is on; and such 30 kilocycle signal is interrupted at the end of the paid program.

For the aforementioned purposes, one terminal of winding 3012 is grounded and the other terminal is connected through rectifier 3110 to the control grid of the relay control tube 3111 which has its anode connected to the positive terminal of a voltage source 3112 through relay winding 3012W. The cathode of tube 3111 is grounded and the control grid is returned to ground through resistance 3113 and the negative voltage source 3114 for purposes of developing the rectified voltage across resistance 3113 so as to increase the flow of current through relay winding 3012W and a cause actuation of the associated switches 3012A and 3012B. Other relay windings are associated in identical manner respectively with the windings 3013 and 3014.

Likewise, the paid programs on Channel 3 and 4 may be made available on lead 3020; and, as a matter of fact, the program from each one of these channels may be simultaneously present on the lead 3020 for selection by the tuner 2841, depending upon the position of the tuning knob 2860. It is evident, using these means, that the subscriber may tune to Channel 2, receive a coin demand, acknowledge such coin demand and then tune to Channel 3 to acknowledge a coin demand set up automatically and thereafter return to Channel 2 to receive the paid program for which he has already paid, without making an additional coin acknowledgment; and, of course, thereafter he may tune to Channel 3 to receive the paid program for which he has paid without making an additional coin acknowledgment.

Similarly, he may tune to Channel 4 and receive the coin demand, acknowledge the coin demand, and thereafter return to Channels 2 or 3, for which he has already paid, and receive the programs over such Channels 2 and 3 without making an additional coin acknowledgment. This may continue with the subscriber tuning back between Channels 2, 3 and 4 and receiving paid programs on Channels 2, 3 and 4, so long, of course, as Channels 2, 3 and 4 continue to transmit the characteristic 30 kilocycle, 35 kilocycle and 40 kilocycle tone signals.

Those channels, for example Channels 5 and 6, transmitting free programs each transmit as a frequency modulation component on the sound carrier, a tone signal of, for example 75 kilocycles so that when the tuning knob 2860 is tuned to either one of such free channels, the resonant relay 2808 is energized to thereby effect closure of switch 2808A to connect the antenna 2865 to the tuner 2841.

Thus, the subscriber may tune to Channels 5 and 6 to receive the free programs over such channels, without of course making a coin acknowledgment, and if he wishes, he may retune to Channels 2, 3 or 4 and receive the paid programs for which he has already paid, without effecting an additional coin acknowledgment.

If desired, the relay switch 2808A may be replaced by an additional normally closed relay associated with relay M in Figure 2 since this relay is energized each time a paid program is being received and is de-energized when a free program is being received. In such case the 75 kilocycle relay 2808 is unnecessary and the sound carriers of free programs need not be modulated with a 75 kilocycle wave.

In this system as described in Figure 41, the marquee and barker are not provided, and the program sound replaces the barker sound.

Thus, prior to coin acknowledgment of a paid program to which the receiver is tuned, or upon reception of a free program, the program sound of such paid or free program, as the case may be, is reproduced on speaker S. The paid program sound which is heard, prior to coin acknowledgment, serves the purpose of the barker. Prior to coin acknowledgment, no video is available although switch M3, at such time, serves to interconnect the self keyed unscrambling means 57 between the video second detector stage 56 and the video amplifier. Upon coin acknowledgment, the video carrier is available on lead 3020 and is reproduced on the cathode ray tube (C. R. T.). When the receiver is tuned to a free program, the relay switch M3 is in its normal position shown in Figure 41 wherein it is effective to connect the second detector stage 56 directly to the video amplifier 59; at this time, the video carrier of the free program is made available to the tuner through switch 2808A.

*Modification shown in Figure 40 for acknowledging coin demand*

The arrangement shown in Figure 40 does not require a positive act on the part of the subscriber or user to effect a coin acknowledgment. For that reason the $F_2$ pulses need not be transmitted, only the $F_1$ and $F_3$ pulses being required. These two pulses may be in the form of tone signals if desired.

The $F_1$ and $F_3$ pulses are detected as previously described and applied respectively to amplifiers 4000, 4001, the output of the amplifier 4000 being applied to the recording head 4003, while the output of the resonant amplifier 4001 after rectification in stage 4002 is applied to the relay winding 4003. Thus, the $F_3$ signals cause energization of relay winding 4003 and operation of the normally open switches 4003A, 4003B and 4003C.

Closure of switch 4003A results in energizing the indicator light 4006 from alternating voltage source 4007, to indicate that a paid program is being received. This indication, if desired, may also be in the form of an audible signal.

Closure of switch 4003C results in energization of the tape driving motor 4008 through the normally closed relay switch 4009A, such motor 4008 serving to drive the magnetic tape 4010 so that at this time a recording is made of the information conveyed by the $F_1$ pulses, it being remembered that the $F_1$ pulses serve generally to identify the program being received.

Closure of switch 4003C results in application of voltage to a two minute time delay relay 4001, such relay being serially connected with the switch 4003C, voltage source 4010 and relay winding 4004. The winding 4004 is energized only however after a two minute time delay effected by the relay 4011. This two minute time delay is imposed to provide a two minute warning prior to energization of winding 4004. Energization of relay 4014 results in closure of the normally closed relay switches 4014A and 4014B. Closure of switch 4014A results in energization of the warning bell 4015 through voltage source 4017. Closure of switch 4014A results in application of voltage from source 4018 to the thirty second time delay relay 4012. After thirty seconds have elapsed, the winding 4009 is energized to thereby open the switch 4009A and de-energize the tape driving motor 4008.

By this means, the subscriber may effect a coin acknowledgment without any action on his part, such coin acknowledgment being ascertained generally by the length of tape which passes the recording head. In the event that the subscriber does not wish to effect a coin acknowledgment, he tunes his receiver from the channel being received to another channel prior to the time the relay winding 4009 is energized. The indicating light 4006 thus serves generally to indicate that a paid program is being received while the audible signal means 4005 indicates that a coin acknowledgment will automatically be made in thirty seconds from the beginning of such audible signal, unless the subscriber tunes his receiver to a different station.

In order to apprise the subscriber as to the character of the paid program which is being transmitted, the relay winding 4014 serves also to actuate the single pole double throw switch 4055A which is connected in the audio circuit in the same manner as switch 4058A to alternatively produce barker sound prior to coin acknowledgment and to provide program sound after coin acknowledgment. Alternatively, this single pole double throw switch 4058A may be operated upon energization of relay winding 4009.

As a further alternative, the relay winding 4009 serves to operate the single pole double throw switch 4055 which is connected in the video, marquee, and unscrambler circuit as is the comparable switch 55 in Figure 2.

By these means, the subscriber is provided with barker sound and marquee, prior to automatic coin acknowledgment.

As indicated previously, coin acknowledgment, using the arrangement shown in Figure 40, is ascertained from the character of the recordings on the tape 4010. The character of the recordings is periodically analyzed and the subscriber is not charged doubly in the event that he may have returned his receiver back to a program which he previously automatically acknowledged. Thus, this arrangement has the inherent feature that the subscriber may tune his receiver from a paid program which he has acknowledged, to a free program for a relatively long time interval, and then return to the paid program which he previously acknowledged, without being charged doubly.

It is understood that the two minute time delay means 4001 and thirty second time delay means 4002 are shown schematic and these particular means, as well known in the art, may take many different forms. For example, the two minute and thirty second time delays may be obtained, using cam operated switches geared through suitable reduction gears, if desired, to the shaft of the tape driving motor 4008.

In a broad sense, the function of the marquee described hereinbefore, is accomplished by the indicating lamp 4006 which, although not describing the character of the program, signifies that a paid program is being received.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a system of the character described, means at a transmitting station for transmitting both scrambled program video for a portion of the field of a picture and for transmitting video signals representative of a marquee for the remainder of said picture field, means at a receiving station for selectively receiving said marquee representative video and said scrambled video, unscrambling means at the receiver normally ineffective for unscrambling the received scrambled video, means at the transmitting station for transmitting coin demand information to the receiving station, means at the receiving station for establishing a coin demand in accordance with said coin demand information, means at the receiver for acknowledging said coin demand, means actuated upon acknowledgment of said coin demand for rendering said scrambling means effective to unscramble the program video and to produce the unscrambled program video, means at the receiver to visually reproduce only said marquee video and not said program video prior to operation of said coin acknowledgment means, and means to prevent the reproduction of said marquee video responsive to acknowledgment of said coin demand.

2. In a system of the character described, means at a transmitting station for transmitting program sound, sound representative of a barker, coin demand information, scrambled program video for a portion of the field of a picture, and video representative of a marquee for the remaining portion of the picture, means at a receiving station normally effective to receive said barker representative sound, to receive said coin demand information and set up a coin demand in accordance therewith, and to visually reproduce only said marquee representative video, unscrambling means at the receiver normally ineffective to unscramble said scrambled program video, means at the receiving station for acknowledging said coin demand, means effective after acknowledgment of said coin demand for rendering said scrambling means effective for reproducing said program video and said program sound and for disabling the barker representative sound reproducing means and for disabling said marquee representative video reproducing means.

3. In a system of the character described, means at a transmitting station for transmitting marquee representative video information within a portion of a picture field and for transmitting scrambled program video within the remainder of said picture field, means at said transmitting station for modulating a sound carrier wave with barker representative sound and with program sound, means modulating said sound carrier wave with at least two different tones, one of which is representative of the value of the transmitted program, and the other one of which serves as an identification of a station and time of transmission, means normally effective at the receiving station for reproducing both said marquee representative video and said barker representative sound, means at said receiver for blanking said scrambled program video portion of a picture field, means at the receiver for establishing a coin demand in accordance with said one tone, means at the receiver for acknowledgment of said coin demand, unscrambling means at the receiver normally ineffective to reproduce unscrambled program video, means at the receiver normally ineffective to reproduce said program sound, and means effective after coin acknowledgment for disabling said marquee representative video reproducing means and for disabling said barker representative sound reproducing means and for rendering effective at the receiver said means for reproducing said program sound and for rendering effective said unscrambling means for reproducing unscrambled program video.

4. In a system of the character described, means at a transmitting station for simultaneously transmitting lines constituting two adjacent pictures, one of said pictures comprising video representing a marquee and the other of said pictures comprising program video, means at a receiving station normally effective to reproduce said marquee representative video, means at the receiving station normally ineffective to reproduce said program video, means at the transmitting station for transmitting coin demand signals to said receiving station for establishing a coin demand at the receiving station, means at the receiving station for establishing a coin demand in accordance with said coin demand signals, means at the receiving station for acknowledging said coin demand, means effective after acknowledgment of said coin demand for disabling said marquee representative video reproducing means and for rendering effective said program video reproducing means.

5. In a receiving system of the character described wherein there are simultaneously transmitted lines constituting two adjacent pictures, one of which comprises video representative of a marquee and the other of which comprises scrambled program video, a receiver for said signals including, means normally effective to reproduce video representative of a marquee and not said scrambled program video, unscrambling means normally ineffective to reproduce scrambled program video, means for establishing a coin demand, means for acknowledging said coin demand, and means effective upon acknowledgment of said coin demand for disabling said marquee representative video reproducing means and for rendering effective said unscrambling means to reproduce program video.

6. In a system of the character described, means for transmitting program sound, barker sound and coin demand information on a frequency modulated wave, said frequency modulated wave comprising sound modulation components representative of a barker, tone signals corresponding to said coin demand information, and a subcarrier which, in turn, is amplitude modulated by said program sound, means at a receiving station normally effective to reproduce said barker representative sound and said coin demand information, means at the receiver for establishing a coin demand in accordance with the received coin demand information, means at the receiver normally ineffective to reproduce said program sound, the last mentioned means incorporating means for demodulating said sub-carrier, means at the receiver for acknowledging said coin demand, and means effective after acknowledgment of said coin demand for disabling said barker representative sound reproducing means and for rendering effective said program sound reproducing means.

7. In a system of the character described for receiving programs transmitted from a plurality of stations, with some of such programs being "paid" programs and some of such programs being "free" programs, a receiving system, means for tuning said receiving system to receive signals from any one of said plurality of stations, coin demand means operated by characteristic signals transmitted with each of said paid programs to establish a coin demand, means for acknowledging said coin demand, means effective upon operation of said coin acknowledgment means for rendering said paid programs available to a subscriber or user, said tuning means being tunable to receive free programs after acknowledgment of a coin demand, and means effective upon retuning said tuning means to receive a previously acknowledged paid program, without the necessity of effecting a second coin acknowledgment of said previously acknowledged paid program.

8. In a subscription system of the character described wherein signals representative of a program for which payment is sought together with characteristic signals are transmitted, a receiver having means normally ineffective to reproduce said program, coin acknowledgement means, means including variable tuning means for receiving said characteristic signals transmitted with said program, and means automatically effective a predetermined time interval after reception of said characteristic signals for effecting the operation of said coin acknowledgement means, means effective upon operation of said coin acknowledge- 9. In a subscription television system wherein there are transmitted video signals representative of a marquee in a first portion of a picture field, sound signals representative of a barker, scrambled program video signals in the remaining portion of a picture field, program sound and coin demand signals, a receiver including means to reproduce sound and video signals, means normally operative to apply said marquee representative video and barker representative sound to said means to reproduce, means to blank said remaining portion of said picture field on said means to reproduce, means normally inoperative to apply said program sound to said means to reproduce, means responsive to said coin demand signals to establish a coin demand, means to acknowledge said coin demand, means responsive to operation of said coin demand acknowledging means to render said barker representative sound and marquee representative video applying means and said means to blank inoperative and said program sound applying means operative, translating means operative responsive to operation of said coin acknowledgment means to unscramble and render intelligible said scrambled program video, and means responsive to operation of said coin acknowledgment means to apply the output of said translating means to said means to reproduce video signals.

10. In a subscription television system wherein there are transmitted sound signals representative of barker sound, scrambled program video, program sound, coin demand signals and program identification signals, a receiver including means to reproduce sound signals, means to reproduce video signals, means normally operative to apply said barker representative sound to said sound reproducing means, means to blank said scrambled program video in said means to reproduce video signals, means normally inoperative to apply said program sound to said sound reproducing means, means responsive to said coin demand signals to establish a coin demand, means to acknowledge said coin demand, means responsive to operation of said coin demand acknowledging means to render said means to blank and said barker representative sound applying means inoperative and said program sound applying means operative, translating means operative responsive to operation of said coin acknowledgment means to unscramble and render intelligible said scrambled program video, means responsive to operation of said coin acknowledgment means to apply the output of said translating means to said means to reproduce video signals, and recording means responsive to operation of said coin demand acknowledging means to record said program identification signals.

11. In a subscription television system wherein there are transmitted in a first part of a picture field video signals representative of a marquee, sound signals representative of barker sound, scrambled program video in a second part of said picture field, program sound, coin demand signals and program identification signals, a receiver including means to reproduce sound signals and video signals, means normally operative to apply said barker representative sound and said marquee representative video to said reproducing means, means normally inoperative to apply said program sound to said reproducing means, means responsive to said coin demand signals to establish a coin demand, means to acknowledge said coin demand, means responsive to operation of said coin demand acknowledging means to render said blanking means, said marquee representative video and said barker representative sound applying means inoperative and said program sound applying means operative, translating means operative responsive to operation of said coin acknowledgment means to unscramble and render intelligible said scrambled program video, means responsive to operation of said coin acknowledgment means to apply the output of said translating means to said means for reproducing video signals, and recording means responsive to operation of said coin demand acknowledging means to record said program identification signals.

References Cited in the file of this patent

UNITED STATES PATENTS

| | | |
|---|---|---|
| 1,626,807 | Gardner | May 3, 1927 |
| 2,000,804 | Wehren | May 7, 1935 |
| 2,082,561 | Appelius | June 1, 1937 |
| 2,107,464 | Zworykin | Feb. 8, 1938 |
| 2,164,297 | Bedford | June 27, 1939 |
| 2,224,702 | Seidel | Dec. 10, 1940 |
| 2,251,301 | Sobotta et al. | Aug. 5, 1941 |
| 2,405,252 | Goldsmith | Aug. 6, 1946 |
| 2,414,101 | Hogan et al. | Jan. 14, 1947 |
| 2,510,046 | Ellett et al. | May 20, 1950 |
| 2,547,598 | Roschke | Apr. 3, 1951 |
| 2,567,539 | Aram | Sept. 11, 1951 |
| 2,570,187 | Aram | Oct. 9, 1951 |
| 2,573,349 | Miller et al. | Oct. 30, 1951 |
| 2,607,847 | Heisig | Aug. 19, 1952 |
| 2,656,407 | Herrick et al. | Oct. 20, 1953 |
| 2,731,620 | Gottfried | Jan. 17, 1956 |